US011018939B1

(12) United States Patent
Harris

(10) Patent No.: US 11,018,939 B1
(45) Date of Patent: May 25, 2021

(54) DETERMINING PRODUCT COMPATIBILITY AND DEMAND

(71) Applicant: Amazon Technologies, Inc., Seattle, WA (US)

(72) Inventor: Michael Robert Harris, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/215,471

(22) Filed: Dec. 10, 2018

(51) Int. Cl.
*H04L 12/24* (2006.01)
*G06K 7/10* (2006.01)
*G06K 7/14* (2006.01)
*G06K 19/06* (2006.01)

(52) U.S. Cl.
CPC ...... *H04L 41/0873* (2013.01); *G06K 7/10722* (2013.01); *G06K 7/10881* (2013.01); *G06K 7/1413* (2013.01); *G06K 19/06028* (2013.01); *H04L 41/22* (2013.01)

(58) Field of Classification Search
CPC . H04L 41/0873; H04L 41/22; H04L 41/0246; G06K 7/10722; G06K 7/10881; G06K 7/1413; G06K 19/06028; G06K 9/00; G06Q 10/00
See application file for complete search history.

(56) References Cited

U.S. PATENT DOCUMENTS

| 2005/0114315 | A1* | 5/2005 | Tanner | H04L 41/0813 |
| 2007/0171288 | A1* | 7/2007 | Inoue | G06T 1/0064 348/241 |
| 2009/0019314 | A1* | 1/2009 | Younger | H04L 41/00 714/37 |
| 2009/0259515 | A1* | 10/2009 | Belimpasakis | G06Q 30/02 709/218 |
| 2010/0154009 | A1* | 6/2010 | Del Sordo | G06F 8/60 725/62 |
| 2010/0332339 | A1* | 12/2010 | Patel | G06Q 20/3224 705/26.1 |
| 2011/0303741 | A1* | 12/2011 | Bolton | G06Q 10/087 235/375 |
| 2012/0079507 | A1* | 3/2012 | Agarwal | H04L 12/2814 719/321 |
| 2013/0132419 | A1* | 5/2013 | Befort | G06F 16/2428 707/769 |

\* cited by examiner

*Primary Examiner* — Chi H Pham
*Assistant Examiner* — Ji-Hae Yea
(74) *Attorney, Agent, or Firm* — Greenberg Traurig, LLP

(57) ABSTRACT

A method of determining compatibility of a network hardware device for connecting to a home security network involves receiving, by a processor of a client device, data from a capture input device of the client device. The data includes identification information associated with the network hardware device. The method also involves transmitting, by the client device, to a server computing device the data comprising the identification information associated with the network hardware device. The method further involves receiving, from the server computing device, compatibility information indicating whether the network hardware device is compatible with a hub device of the home security network. Additionally, the method involves displaying, on a display of the client device, the compatibility information.

21 Claims, 17 Drawing Sheets

DETERMINING PRODUCT COMPATIBILITY AND DEMAND

TECHNICAL FIELD

The present embodiments relate to audio/video (A/V) recording and communication devices, including A/V recording and communication doorbells, security cameras, and floodlight controllers. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present methods and systems for determining product compatibility and demand now will be discussed in detail with an emphasis on highlighting the advantageous features. These embodiments depict the novel and non-obvious methods and systems for determining product compatibility and demand shown in the accompanying drawings, which are for illustrative purposes only. These drawings include the following figures, in which like numerals indicate like parts.

DETAILED DESCRIPTION

Figure 1:
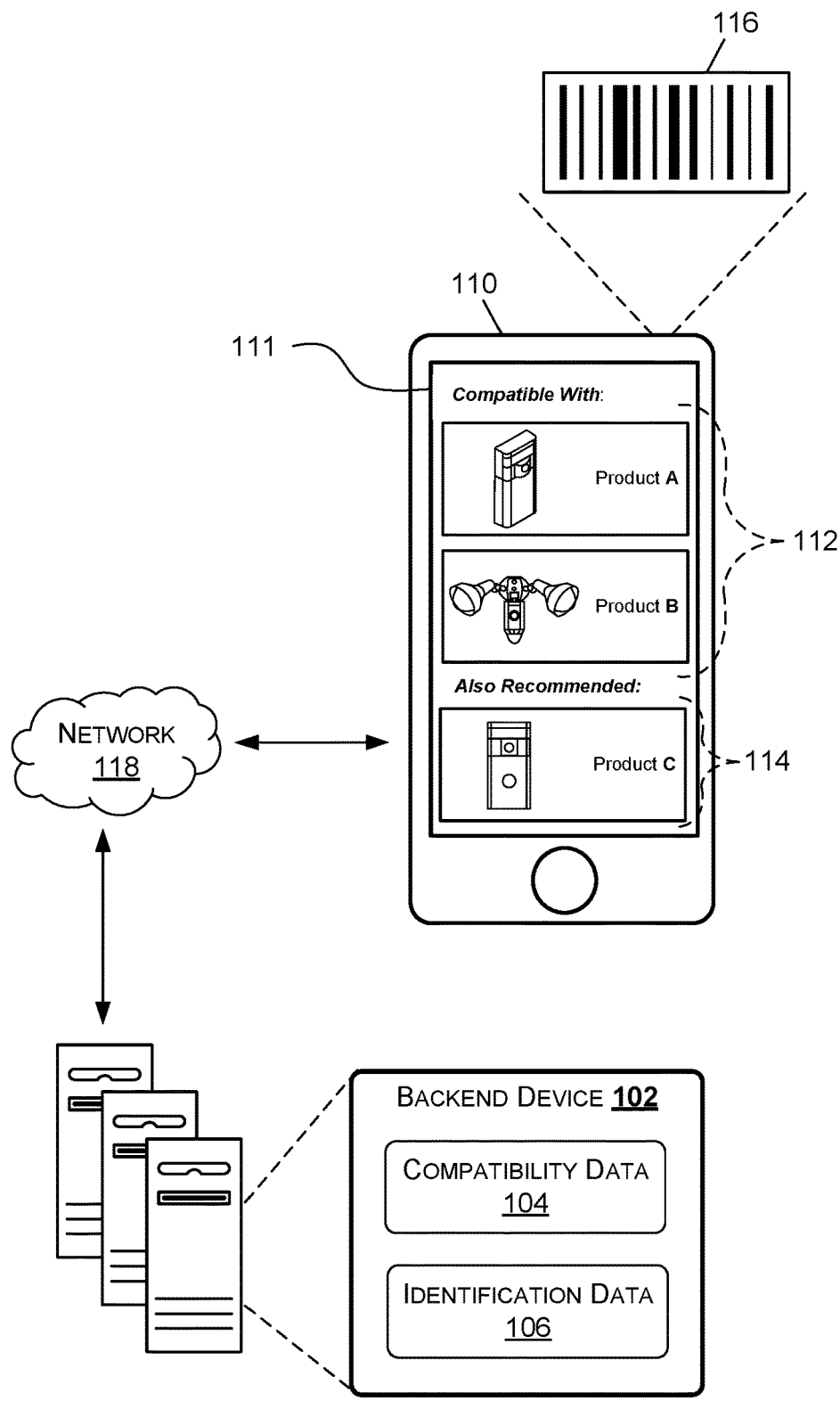
FIG. 1 is a schematic diagram of example devices and functionality for a product compatibility determination, according to various aspects of the present disclosure.

Network-connected devices (e.g., computing devices, home automation devices, security devices, IoT ("Internet of Things") devices, backend servers, etc.) are often capable of communicating with, interacting with, and/or controlling other devices. Sometimes this communication is direct (e.g., Bluetooth, Wi-Fi Direct, infrared, etc.), and sometimes this communication occurs over a network (e.g., a LAN ("Local Area Network") or a WLAN ("Wireless Local Area Network")). This communication may also occur through one or more intermediate devices, such as backend servers, for example over the Internet. Some network-connected devices are capable of communicating with, interacting with, and/or controlling other devices using one or more communication protocols, mediums, or standards. For example, a network-connected device may communicate using a particular application layer (e.g., HTTP, FTP, SSH, etc.), transport layer (e.g., TCP, UDP, etc.), and/or other layers.

In addition to a device's communication protocol, medium, or standard, a device may be configured to send and/or receive information that is organized or structured in a particular manner. For example, a device may be configured to receive messages with a specific type of header or metadata, to which the device may respond with a corresponding message or by performing some action based on the contents of that message. As another example, a device may transmit encrypted data according to a particular encryption scheme. As yet another example, a device may provide a communication endpoint, such as an API (Application Programming Interface), that can be interacted with to control the device's settings or operation, or to obtain information about the device. Some APIs may grant different levels of access and control to different devices or services interacting with it.

The degree to which two devices are compatible or interoperable may range from complete incompatibility to full control of the device's available features. The level of compatibility between two devices may depend on the extent of syntactic interoperability (e.g., communication protocols and data formats) and/or semantic interoperability (e.g., the ability of the two devices to interpret exchanged information, relative to an information or object model), among other aspects of interoperability. Accordingly, the level of compatibility between two devices may be determined based on a comparison between the physical, syntactic, and/or semantic aspects of the communication of each device.

Where a set of devices are capable of communicating with each other toward some common goal, those devices may form what is referred to as an "ecosystem." For example, a set of home security devices (e.g., window sensors, door sensors, motion sensors, A/V recording and communication devices, etc.) may be configured to communicate with each other, with a communication hub, and/or with a backend server to collectively serve as a security system for a home, business, or other premises. Thus, the compatibility of a particular device may include a description of whether, and/or to what extent, that particular device can operate within one or more ecosystems.

Manufacturers sometimes release products whose functionality is modified or extended through one or more software updates. For example, a smartphone or tablet application may be updated after its initial release, with the updated version pushed to each client device that has that application installed thereon. The functionality of each client device, therefore, might vary over time, which might affect the interoperability of that device with another device.

The consumer is therefore left with the task of investigating whether a product that the consumer intends to purchase is compatible with that consumer's client device, security system, home automation devices, or product ecosystem. In situations where a consumer is shopping at a brick-and-mortar retail store, a product's physical packaging may not reflect its most up-to-date functionality, due to a software and/or firmware update released after the product was packaged and/or after the product's packaging was produced. Even if the product's functionality is unchanged from its initial release, a would-be purchaser of a product may own dozens of devices, and the decision to purchase that product may depend on the extent to which that product can operate within that consumer's product ecosystem. Without accurate knowledge of the interoperability between the consumer's devices and a potential product purchase, the consumer may make an uninformed purchasing decision or may forgo purchasing the product altogether because the consumer is unaware of how that product may function with other devices that the consumer owns.

Embodiments of the present disclosure solve this problem by providing an application that executes on a client device or other computing device with which a user can scan a product to determine its compatibility status relative to one or more other devices. In some cases, the application may display one or more devices that are compatible with the scanned product. In other cases, the application may display which, if any, of the user's existing devices are compatible with the scanned product. For example, a user may have integrated in a home, business place, or other premises a security system that includes a central hub device that communicates with one or more sensors, cameras, home automation devices, and/or other security devices via a home security network. An example application displays whether (or the extent to which) the scanned product can communicate with the hub device via the home security network. Additionally, a user might configure the application to associate one or more devices with the user, such that the compatibility of scanned products is determined relative to the one or more devices associated with the user.

As a specific example, an application for configuring and controlling a security system may include a registration process, by which a user adds one or more devices to the security system. The application might, for instance, allow the user to monitor the status of these devices (e.g., the status of a door-open sensor indicative of whether the front door is open or closed). This application may store—locally and/or on a remote storage device and in association with the user—the list of devices in the user's security system. When that user scans a product that the user is considering for purchase, the application may determine or obtain the compatibility status of the scanned product relative to the list of existing devices within the user's security system. In this manner, a user may determine with relative ease the extent to which a product fits within that user's ecosystem.

In addition to determining compatibility status, the application may provide other useful information to the user related to a scanned product. For example, if a newer product model or version of the scanned product is scheduled for release in the near future (e.g., within a threshold period of time), the application may display information to the user about the upcoming product release. In some embodiments, the application may also provide to the user suggested or recommended product purchases. Such recommendations may be provided on the basis of the devices already owned by the user (e.g., devices that are compatible with and/or enhance the user's ecosystem), the user's previous product scans (e.g., "you may also be interested product X"), and/or other bases.

Determining the extent to which two products are compatible may involve comparing the physical attributes, communication schemes, and/or existence or lack of features between the two products. As a specific example, a window sensor may communicate information about window movement events (e.g., date and time of the event, displacement of the window movement, etc.), the position value indicating how open the window is, and/or other information. The window sensor may also be capable of being calibrated, labeled or named, or otherwise configured. Additionally, the window sensor might be able to transmit information over Bluetooth or Wi-Fi. Consider a communication hub that uses Wi-Fi to poll (in a read-only fashion) security sensors to determine each of their statuses. The communication hub is compatible with the window sensor, insofar as it uses at least one common communication protocol (e.g., Wi-Fi), and can interact with some of the window sensor's information (e.g., retrieve window movement events and obtain window position). However, the communication hub in this example cannot communicate over Bluetooth, nor can it calibrate or otherwise configure the window sensor ("writing," rather than "reading" operations). Each of these features can thus be compared to determine the compatibility status of the communication hub with respect to the window sensor. This compatibility status may be displayed as a matrix of features, for instance, showing which window sensor features can be accessed by the communication hub. Alternatively, or additionally, the compatibility status may be constructed as a sentence (e.g., "The communication hub can poll window sensor movement events via Wi-Fi only, and cannot configure the window sensor.").

In some embodiments, the compatibility between two products may be based on physical attributes rather than digital features. For example, an A/V recording and communication device ("A/V device") may be powered by a replaceable and rechargeable battery. A user may wish to purchase additional backup batteries, but may be unsure whether a given battery can be used with the A/V device.

The battery cavity of the A/V device may have a particular shape, the battery terminals may have a specific shape and placement within the battery cavity, and/or the A/V device may be designed to receive a battery with a particular voltage. However, different iterations of the A/V device may have different battery cavities, or might be configured to receive different battery voltages. In an example, a user shopping in a retail store may wish to determine whether a replacement or supplemental battery is compatible with his or her version of an A/V device, which may be accomplished by scanning the battery product and viewing the compatibility information displayed in the application on the client device. Thus, embodiments of the present disclosure may involve determining compatibility through comparison of physical attributes (e.g., shape, size, dimensions, voltages, etc.).

In some implementations, the client device and/or a backend server may store, include, or be in communication with a table, database, or other electronic storage that stores encoded relationships representing the compatibility statuses among a set of products. As one example, a home security hub may be generally compatible with an A/V device produced by the same manufacturer. The compatibility status between those two devices might be stored locally on the client device (in association with the application) and/or on a backend server (accessible by the application over a wide area network). As another example, the home security hub may communicate in accordance with some application programming interface (API) or messaging schema. In this example, the stored relationship may be a representation of the API or messaging schema with which the product communicates, such that two products that use the same API or messaging schema are compatible with each other.

In another example, one or more features of a given product may be stored in association with that product, such that determining compatibility statuses involves evaluating whether one product is able to communicate, poll, control, or otherwise interact with a feature of another product. For instance, a home security hub may include an "arm" feature that puts each home security device or sensor in an alert scanning mode (e.g., reporting any detected movement, opening of doors or other points of entry, etc.). If an outdoor motion sensor can operate in multiple modes, including an "armed" mode, then the compatibility status between the home security hub and the outdoor motion sensor at least includes "armed" compatibility.

A virtual assistant (VA) device may be interacted with and/or controlled through voice commands by the user. The VA device may be connected to the Internet and/or another network, such that it can communicate with backend servers, APIs, and/or other services. As a specific example, an A/V device may provide two-way voice communication between a visitor at a door and a device of the user equipped with a speaker and a microphone. Although not a physical attribute or a direct digital communication, the VA device may nonetheless be compatible with the A/V device if it is capable of providing the two-way voice communication with the A/V device. Such functionality may be provided by a backend server, which streams live voice data from the A/V device to the VA device and vice versa. While the VA device is generally capable of communicating with backend servers, the specific backend servers with which it communicates may be updated over time to introduce new functionality to the VA device. In this manner, the primary backend server through which the VA device communicates may be updated to provide the two-way voice communication with the A/V device. The compatibility of two devices may therefore depend on the capabilities of servers or APIs on separate computing devices.

As illustrated in the examples above, the interoperability among devices is substantially more complex as networked computing devices become more commonly integrated into the home, business place, or other premises. Determining whether two devices are compatible with each other might involve a comparison of physical attributes, electrical specifications, digital communication schemes, capabilities of backend servers, and/or other features. Whereas consumers in the past were more readily able to determine whether two products were compatible (e.g., where compatibility was primarily based on physical attributes), consumers today are faced with a more difficult task of determining product compatibility. With many features of modern devices being difficult to observe directly (e.g., communication schemes, APIs, backend server functionality, etc., all of which are subject to change over time through software updates), determining product compatibility has become a substantial technical problem to overcome.

As described herein, "compatibility" refers to the extent to which two or more products, computing devices, sensors, network hardware devices, client devices, backend servers, and/or other devices are physically congruent, electrically suitable, syntactically interoperable, semantically interoperable, and/or otherwise capable of direct or indirect communication and/or control. The extent of compatibility between two devices may depend on hardware and/or software elements of the devices themselves, and/or on the backend servers that support the operation and functioning of the devices.

As described herein, "compatibility status" refers to any representation indicating the extent, manner, and/or qualities of the compatibility between two or more devices. The compatibility status may be a binary indication (e.g., compatible or not compatible), or may be a more qualitative description of compatibility (e.g., a feature matrix, a sentence describing how the devices are compatible, etc.). The compatibility status may be determined through retrieval from storage (e.g., where the compatibility status is predetermined) or through an evaluation of the features of the devices (e.g., comparing stored features of the products to determine the extent of compatibility between the products).

As described herein, a "relationship" for determining compatibility may refer to any association, connection, or other link between two devices and/or features. As a specific example, a feature may include an alert function that causes one or more speaker-equipped devices in a home security network to produce a sound responsive to detecting a broadcast alert message. An example "relationship" may be a table or database that stores a representation of whether a device is configured to produce an alert sound responsive to detecting the broadcast alert message. A "relationship" may also refer to a table, database, or other association that stores the compatibility status between at least two products.

As described herein, "identification information" refers to a representation of a particular product or device. Identification information may be specific to a version or iteration of a product. The identification information may be embedded in a machine-readable optical label, such as a barcode or QR code, or in another scannable label (e.g., RFID tag, NFC tag, text on the product packaging that can be "scanned" via text recognition, etc.).

Embodiments of the present disclosure involve capturing identification information of a product, which is then compared against compatibility information to determine one or more compatibility statuses with respect to one or more devices. The captured identification information, in some implementations, is transmitted to a backend server, which carries out the compatibility determinations. A client device may, in addition to transmitting identification information to the backend servers, transmit information about the context in which the identification information was scanned. For example, the client device may provide a date, time, location, and/or information about the user to the backend server. The backend server may collect this "scan metadata" in order to learn about consumer demand for the product.

As a specific example, scan metadata over a period of a month may indicate a spike in the number of scans for a particular A/V device in a particular region. Such activity may arise, for example, in response to an increase in reported crimes (e.g., consumers wishing to purchase home security devices to monitor their home). Given a set number of retail stores in the region with a limited amount of stocked A/V devices, continuing to supply the same number of A/V devices to the retail stores in that region may result in a shortage of A/V devices for purchase by that region's consumers.

Embodiments of the present disclosure address this problem by estimating product demand based on aggregated scanned metadata. From a large scale supply chain perspective, scanned metadata may serve as a basis for determining an appropriate number of products to supply to different retail stores in a region and/or around the country.

As another example, a lack of scanned metadata for a particular product in a particular region may indicate a lack of consumer interest in that particular product. Embodiments of the present disclosure may involve identifying one or more regions that are associated with a demand for the particular product below some threshold, and performing some action to increase the demand for that product or otherwise encourage sales of the product. For instance, localized advertising campaigns may be launched in regions with lower consumer interest in a particular product.

In some cases, a large number of scans for a particular product in a region may indicate an increase in demand for other products related to that particular product. As a specific example, an A/V device may be compatible with a motion sensing device, such that the motion sensing device can be used to trigger the A/V device's video recording functionality. As another example, an A/V device may be battery operated, such that the purchase of a secondary battery allows for virtually continuous operation (by alternating between charging and using the battery with the A/V device). With such tight integrations or common aftermarket purchases, embodiments of the present disclosure may estimate a demand for those related aftermarket or commonly purchased add-on products based on scanned metadata associated with the A/V device. Other examples are also possible.

Regardless of the implementation, embodiments of the present disclosure may include storing scan metadata in conjunction with the identification information, processing that scan metadata to estimate the demand for one or more products (or lack thereof), and perform some action based on that estimated demand (e.g., launch or modulate advertising campaigns, ship more or fewer products to a given retail store, inform a given retail store about the demand for a product, inform a manufacturer about the temporal and/or geographic details related to a product's demand, etc.).

In various embodiments of the present disclosure, the scan events for a particular user may be stored in association with that user over some period of time. The products scanned, the time and/or date on which the scans occurred, the location and/or store at which the scans occurred, and/or other contextual information related to the scans may represent patterns, trends, and/or other information related to the interests of that particular user. These patterns, trends, and/or interests derived from the user's scan data (and/or other behavior data) may be used to enhance the particular user's shopping experience, provide product recommendations, and/or infer the user's intent.

As a specific example, a particular user may perform one or more scans for networked door locks (e.g., door locks that report their lock status to a security hub, door locks that can be remotely operated, etc.). Based on those one or more scans for networked door locks, systems of the present disclosure may infer that the particular user has an interest in security devices generally or, perhaps more specifically, that the particular user is interested in purchasing a new door lock. One or more of these derived interests or intents may serve as the basis for informing the particular user about other products, making product recommendations, and/or providing other information to the user.

For instance, if the particular user scans a few networked door locks, but is unable to find a product in the brick-and-mortar store with the features the user is looking for, or is unable to find a product that is satisfactorily compatible with the user's home security system, systems of the present disclosure may provide product recommendations to the particular user. The product recommendations may include products with features that are different from the features of the scanned products, to possibly suggest a product that the user was initially looking for but was unable to find. Alternatively or additionally, the system may determine the extent of compatibility of related products other than those that the user has already scanned, and display or otherwise communicate to the user one or more satisfactorily compatible products (e.g., the most compatible door lock or locks available with respect to the user's home security system). In this manner, the tracking and storage of scan events may enhance the user's shopping experience by locating products for the user to purchase that the system has inferred to be of particular interest to the user, based on the user's scan behavior.

Other, more general information may be inferred from the user's scan behavior, in addition to the product purchasing interests described above. For example, the user's scan events may occur in certain types of stores, indicating general shopping preferences for the user. As one example, the user's scan events may occur primarily or frequently at hardware stores. As another example, the user's scan events may occur primarily or frequently at home goods or domestic merchandise retail stores. However, the same product or products may be sold at both hardware stores and home goods stores. While the frequent scan locations may be indicative of a user's shopping location preferences, those locations may also represent information about the user's interests and/or skills. For example, users that frequently shop at hardware stores may, for instance, have comparatively higher handiwork skills than those who frequently shop at home goods stores. Some products may be more difficult to put together, mount, or otherwise set up than other products. For example, some products may involve routing existing power and/or data connections into the product (e.g., wiring for a thermostat or doorbell may be reused for networked thermostats or doorbells), whereas other products may be simpler to set up (e.g., a wireless doorbell with a smartphone application that guides users through a step-by-step setup process). Systems of the present disclosure may infer from a particular user's scan behavior data that user's level of handiwork skills and, in turn, provide product recommendations commensurate with that user's skills. In this manner, the user's scan behavior data may mitigate the potential for a user to purchase a product that is too difficult for him or her to set up and install.

In addition to scan data, embodiments of the present disclosure may make inferences from other data collected about the user and/or from the user. For example, information about the user may be stored in association with that user's account, such as the type of home, business, or premises in which a security system is installed, the types of products the user is interested in, and/or other characteristics of the user, such as age and/or gender. Furthermore, the user may conduct online or Internet-based shopping, which may supplement and/or augment the product recommendations provided. In some instances, survey data may be collected from the user, either through the scan application on the user's client device, via email, phone call, and/or other means. The collected survey data may also serve as a basis for inferring the user's product interests, capabilities, and/or other characteristics of the user that might affect the user's shopping preferences.

As yet another example, aesthetic characteristics of devices may impact the product recommendations provided to the user. For example, if the user scans for, searches for, or otherwise appears to be interested in silver-colored products, then the systems of the present application may provide product recommendations that are also silver-colored. Other aesthetic qualities of products may be taken into account as well. For instance, some devices may have housings with rounded edges, whereas other devices are more angular or faceted. The user's scan history, shopping data, existing products, and/or other information about the user may be analyzed to construct a "profile" or the like representative of the user's aesthetic preferences. Such an aesthetic profile may also be used to sort products in search results or product recommendations, where products having aesthetic qualities most similar to the user's preferences are shown first.

In various embodiments, a user's interests may be determined based on feature data extracted from existing data sources. For instance, the aesthetic qualities of a particular A/V recording and communication device may not be explicitly encoded (e.g., not listed in the product specifications, not used to describe the product on a website, etc.). In these instances, systems of the present disclosure may employ image recognition software to extract aesthetic features from images and/or videos of the product. As another example, the relative installation or setup difficulty for a particular product may not be explicitly (numerically or otherwise) encoded on a product listing webpage or in a product database. In these examples, the installation difficulty and/or setup difficulty may be determined based on other listed features of the product, such as the length of the installation instructions (e.g., number of words, number of pages, number of steps, etc.). The installation and/or setup difficulty may, in some cases, be derived from product reviews (e.g., "I would give the product a five-star rating, but it was a pain to install.").

A given user may also have a relatively greater interest in a particular brand over other brands. The user's brand preference may be determined based on the user's existing products, the user's shopping behavior and/or scan events, and/or from survey data, among other sources of data.

Embodiments of the present application include the realization that interests and/or preferences of a particular user may vary over time. For example, a user may be interested in purchasing a smart door lock for a period of one week, during which time the user scans multiple products and/or searches for door locks to purchase on one or more websites. At the conclusion of that one-week period, the user may then purchase a specific door lock, and integrate that door lock into his or her home security system. Thus, temporal proximity to the present time (e.g., the age of the data) may be a factor in inferring the user's preferences. Systems of the present disclosure may capture—in association with scan events, online shopping behavior data, survey data, and/or other data (collectively "user behavior data")—a date and/or time at which the user's interests or preferences were expressed. The date and/or time (referred to hereinafter as "date") may serve as a basis for weighting the user behavior data. For example, a scan event that occurred three months ago may be given relatively less weight than a scan event that occurred a week ago, in determining the user's preferences and/or interests.

In various embodiments, the weight assigned to one user preference or interest may differ from the weight assigned to a different user preference or interest. For instance, the user's aesthetic interests may change more slowly compared to the user's interests in a particular product. Thus, for the purpose of determining aesthetic interests, the user's behavior data from a year ago may be given a marginally lower weight compared to behavior data from a week ago. In comparison, the user's home security interests may fluctuate over time, as the user satisfies particular wants or needs by purchasing particular products. Thus, a profile of the user's interests and/or preferences may be updated over time. This update may occur automatically, according to a weighting decay relationship (e.g., decrease the weight of data X by Y % every week).

The above-described "weight" values may vary based on factors other than temporal proximity of data points to the present date. For instance, if the user scanned multiple different A/V recording and communication devices a month ago, and subsequently purchased a particular A/V recording and communication device a week ago, then the weight given to those scans for the purpose of determining the user's product interests may be diminished by a greater amount compared to a weighting decay that is based only on time.

Some user behavior data may be ignored, or given a lower weight, based on the data being "clustered" (e.g., close in product type, date, etc.). For example, a user may scan a variety of A/V recording and communication devices at a brick-and-mortar store to compare their features and compatibility. Based on the scan events occurring on the same date (e.g., within a few minutes of each other), those scan events may not be reflective of the user's aesthetic preferences, for example, but rather may indicate the user's interest in purchasing a particular product type. In contrast, another set of data may better reflect the user's aesthetic preferences, such as the user's owned products, "saved" products (e.g., in a wish list stored in connection with an online retail website), and/or based on the user's explicitly stated aesthetic preference (e.g., from a questionnaire in constructing a user profile, based on survey data, etc.).

In some cases, product recommendations made to the user may depend on data collected that relates to a particular user, but did not originate from the particular user. For instance, the user may live in a neighborhood experiencing a spike in package theft. Based on the user's address, systems of the present disclosure may recommend the purchase of a particular security product or products to guard against or mitigate that increase in crime (e.g., an A/V recording and communication device to capture video of a package delivery location, such as a front doorstep).

In each of these examples, profiles of the user's interests and preferences may help provide a customized, personalized shopping experience to each individual user. If a user scans a product that is likely to be difficult for him or her to install, the client device application may recommend to the user an alternative product that more suitably fits their handiwork capabilities. If a user scans a product that doesn't match their preferred aesthetic, the client device application may recommend to the user an alternative product that better matches those aesthetic preferences, or recommend aftermarket parts to augment the aesthetic of the scanned product. If the user scans a product of the type they would like to purchase, but of a brand that is not among their preferred brands, the client device application may recommend to the user an alternative product or products from one or more of their preferred brands. In this manner, the user's shopping experience can be greatly enhanced.

The remaining detailed description describes the present embodiments with reference to the drawings. In the drawings, reference numbers label elements of the present embodiments. These reference numbers are reproduced below in connection with the discussion of the corresponding drawing features.

FIG. 1 is a schematic diagram of devices and functionality that may find use in an example product compatibility determination, according to various aspects of the present disclosure. In this example, a client device 110 is equipped with a scanning device (not shown) and a display 111, and is configured to communicate over a network 118 with at least one backend device 102. The client device 110 initially scans an identification tag 116 affixed to or otherwise associated with a particular network hardware device, to determine identification information that uniquely refers to the particular network hardware device. The client device 110 then transmits the determined identification information to the backend device 102 via the network 118. The backend device 102, upon receiving the identification information, determines the extent to which the particular network hardware device is compatible with a plurality of products, including products A, B, and C, based at least on compatibility data 104. The backend device 102 then transmits the determination of compatibility—or the "compatibility status" of the particular network hardware device with respect to products A, B, and C—to the client device 110 via the network 118. The client device 110 subsequently displays the compatibility status of the scanned network hardware device relative to products A, B, and C.

The identification tag 116 may be any type of machine-readable label, radio frequency identification (RFID) tag, near field communication (NFC) tag, barcode, QR code, or any other type of identifier. The client device 110 may be equipped with a combination of hardware and/or software to extract the identification information from the identification tag 116, such as an RFID scanner, an NFC reader, a camera, image analysis software to decode barcodes or QR codes, and/or software to extract text from images, among others. Regardless of the particular type of identification tag 116, the client device 110 is configured to read the identification tag 116 and extract the identification information therefrom.

The backend device 102 may be a backend server or other computing device configured to store information for determining the product compatibility. The network 118 may be a local area network (LAN) or a wide area network (WAN), such as the Internet. The backend device 102 may store the compatibility data 104 thereon, which may encode information such as product-to-product compatibility relationships, features about products, and/or other information for carrying out compatibility determinations as described herein.

The backend device 102 may also perform processing to determine the compatibility statuses of products A, B, and C with respect to the scanned network hardware device. For instance, the backend device 102 may compare physical attributes, software elements, and/or other specifications of each of the products A, B, and C with those of the scanned network hardware device. Such a determination may be preferred over predetermined compatibility statuses where the devices depend on software that is subject to change over time (e.g., due to software updates, firmware updates, changes to the functionality of backend servers, etc.). Techniques for determining compatibility statuses are described in greater detail herein.

In some embodiments, some or all of the backend device's 102 stored data and/or functionality may be implemented on the client device 110, such that the client device 110 can evaluate compatibility without communicating with the server 102. In some embodiments, the client device 110 may include sufficient data storage space and processing power to carry out the techniques of the present disclosure without external processing.

The determined compatibility statuses may then be displayed on a user interface of the client device 110. In this example, a compatibility section 112 of the client device 110's display 111 shows that the scanned network hardware device is compatible with products A and B. In some cases, the client device 110 may be associated with a user and/or account that has products A and B registered thereto. For instance, the user may own products A and B, which form a part of that user's home security system.

In addition to providing compatibility determinations, some embodiments of the present disclosure involve providing product recommendations or related product information to the user. In this example, a recommended product section 114 of the client device 110's display 111 shows that product C is recommended based on the scanned network hardware device. The recommended product may be, in some instances, a device that has greater compatibility with products A and B. In other instances, product C is an aftermarket item (e.g., cosmetic item, auxiliary battery, etc.) for the scanned network hardware device. In some embodiments, product recommendations may be determined and/or provided specifically in response to a determination that the scanned network hardware device is not compatible with one or more of the user's devices (e.g., products A and B), and the recommendations may include one or more products that are similar to the scanned network device, but that are compatible with the user's products. Other types of product recommendations are also possible, and are described in more detail below.

Figure 2:
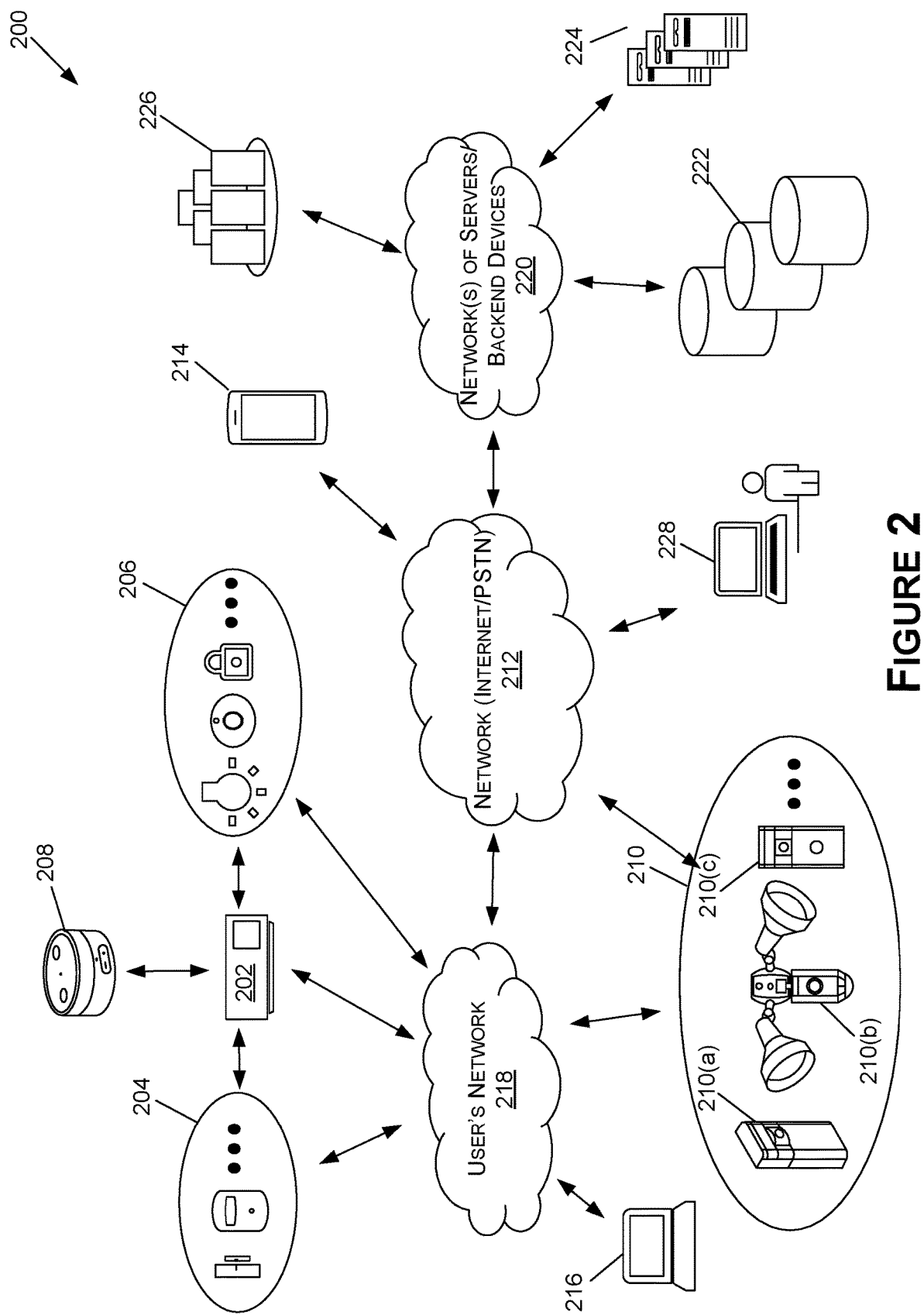
FIG. 2 is a functional block diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enables users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices ("A/V devices") 210, etc.), when remotely monitored and controlled via a network (Internet/a public switched telephone network (PSTN)) 212 (which may be similar to, and represent the network 112), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively be referred to herein as "A/V devices 210" or "A/V device 210") (which may represent, and/or be similar to, the A/V device 110 of FIG. 1). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premises, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216 (which may represent, and/or be similar to, the client device 110 of FIG. 1). The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more servers 224, and one or more application programming interfaces (APIs) 226. While FIG. 2 illustrates the storage device 222, the server 224, and the API 226 as components separate from the network 220, it is to be understood that the storage device 222, the server 224, and/or the API 226 may be considered to be components of the network 220. For example, the network 220 may include a data center with a plurality of computing resources used to implement the storage device 222, the server 224, and the API 226.

The server 224 may comprise a computer program or other computer executable code that, when executed by processor(s) of the server 224, causes the server 224 to wait for requests from other computer systems or software (clients) and provide responses. In an embodiment, the server 224 shares data and/or hardware and/or software resources among the client devices 214, 216. This architecture is called the client-server model. The client devices 214, 216 may run on the same computer or may connect to the server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The API 226 may comprise, for example, a server (e.g. a real server, or a virtual machine, or a machine running in a cloud infrastructure as a service), or multiple servers networked together, exposing at least one API to clients. In various embodiments, the API 226 is provided by servers including various components such as an application server (e.g. software servers), a caching layer, a database layer, or other components suitable for implementing one or more APIs. The API 226 may, for example, comprise a plurality of applications, each of which communicate with one another using one or more public APIs. In some embodiments, the API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the server 224, the API 226, the storage devices 222, etc.) may be referred to herein as a "network device" or "network devices." The "network hardware device" described with respect to FIG. 1 may include one or more of the network devices described herein.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

Figure 3:
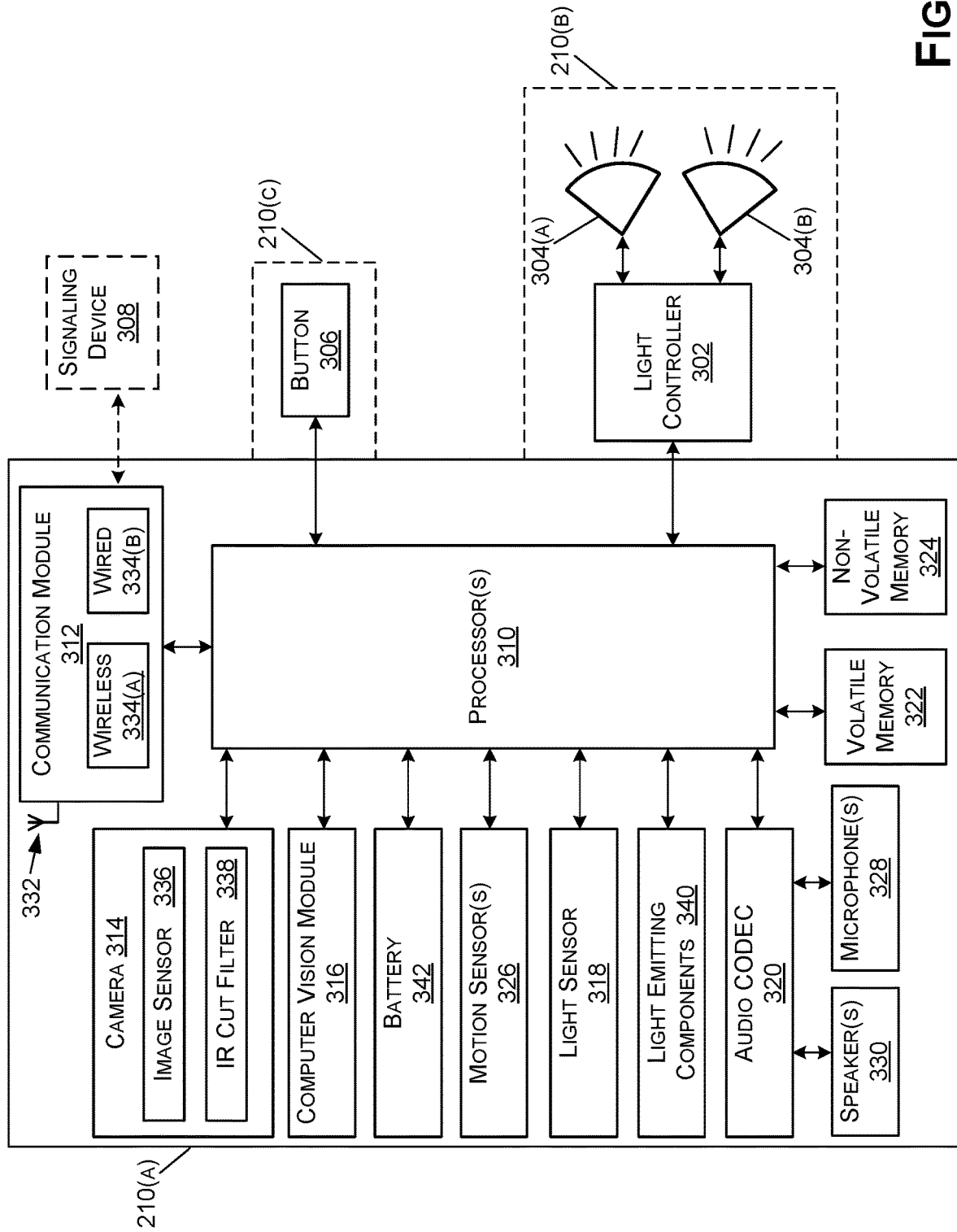
FIG. 3 is a functional block diagram of an A/V recording and communication device according to various aspects of the present disclosure.

FIG. 3 is a functional block diagram for an audio/video (A/V) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or the another wireless communication protocol).

With further reference to FIG. 3, the A/V device 210 may include a processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller) may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(a) and wired 334(b) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(c) is pressed, the communication module 312 may be triggered to perform one or more functions, such as to transmit a signal over the wired 334(b) connection to the signaling device 308 (although, in some embodiments, the signal be transmitted over a wireless 334(a) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the server 224 and/or the API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

Although the A/V device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video functionalities. In other examples, the A/V device 210 may only have the speaker(s) 330 and not the microphone(s) 328, or may only have the microphone(s) 328 and not the speaker(s) 330.

Figure 4:
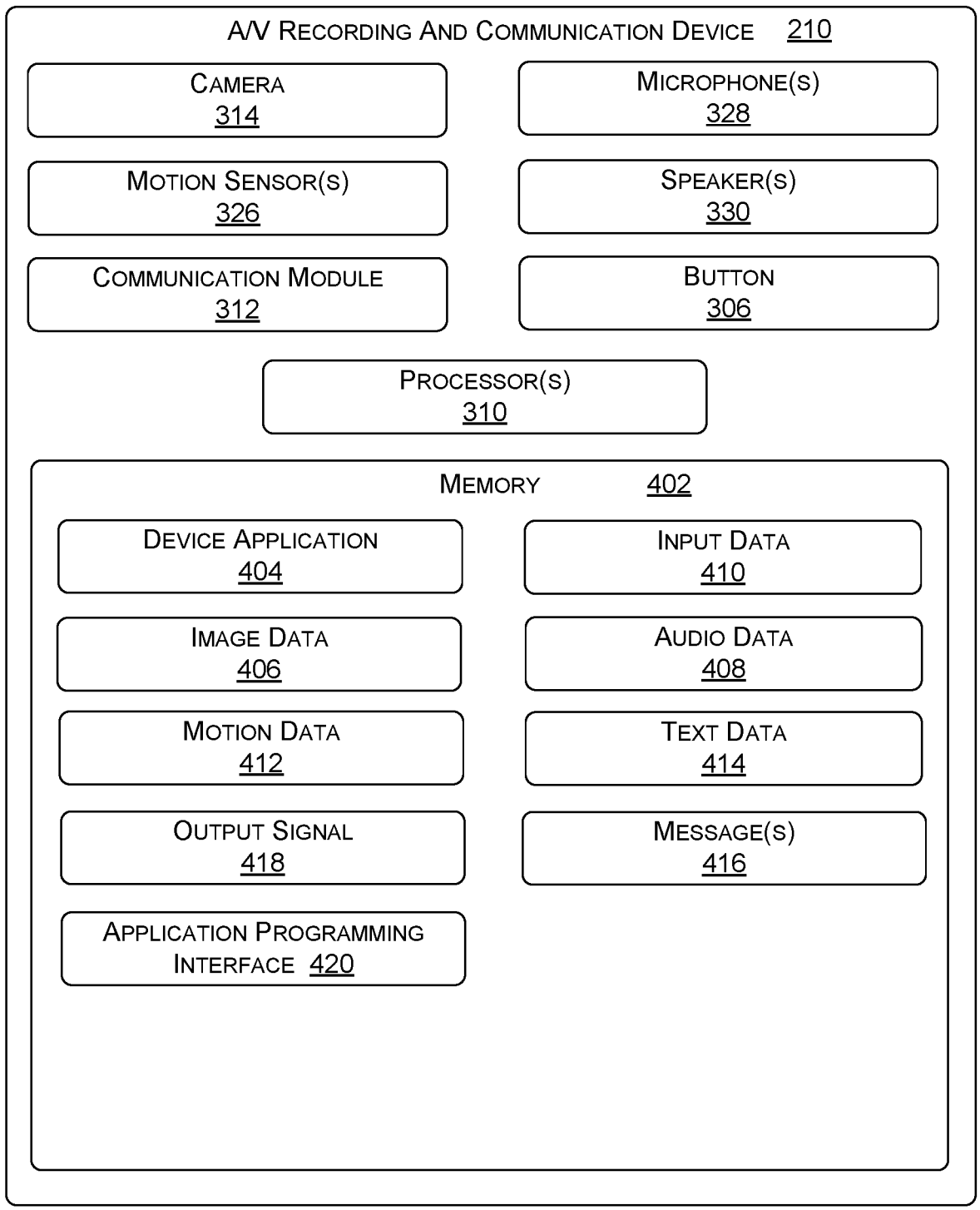
FIG. 4 is a functional block diagram illustrating one example embodiment of an A/V recording and communication device according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V doorbell 210(c), the A/V security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the server 224 and/or the hub device 202 using the communication module 312. The server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the server 224, and the server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device. The format and arrangement content of message(s) 416 may affect its compatibility relative to other electronic devices.

The image data 406, the audio data 408, the text data 414, and/or the motion data 412 may be tagged with (e.g., a time stamp, based on clock data) and/or stored separately (e.g., on the server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, at least some of the processes of the server 224, the hub device 202, and/or the client device 214, 216 may be executed by the A/V device 210. The A/V device 210 may also include an application programming interface (API) 420, representing one or more methods, functions, or software routines that can be accessed and/or executed by other devices. For example, the A/V device 210 may include a function that begins storing a record of live video in local memory or storage. The API 420 may allow that function to be triggered by other devices. For instance, the smart-home hub device 202 may cause that function to execute based on a timed schedule, events from security devices, user input, or another trigger. By providing the API 420, the A/V device 210 may therefore provide for extended interoperability. In the example described above, the smart-home hub device 202 may be "compatible" with the A/V device 210, with a compatibility status that includes the ability to trigger the A/V device's 210 record video function.

The API 420 may provide for other opportunities for interoperability as well. For instance, the API 420 may enable the exchange of data to and from the A/V device 210. The API 420 may allow other devices to obtain information about the A/V device's 210 functionality, software and/or hardware version information, identification information of the A/V device 210, and/or obtain a list of functions within the API 420 itself. Any of these pieces of information may be used to determine the extent to which the A/V device 210 is compatible with another device. As an example, the smart-home hub device 202 may be capable of communicating with the A/V device 210 if the A/V device 210 has a firmware version at or above a particular version number. Embodiments of the present disclosure may involve obtaining, from the API 420, the firmware version number of the A/V device 210, and determining whether that firmware version number is at or above the particular version number required for compatibility with the smart-home hub device 210.

Figure 5:
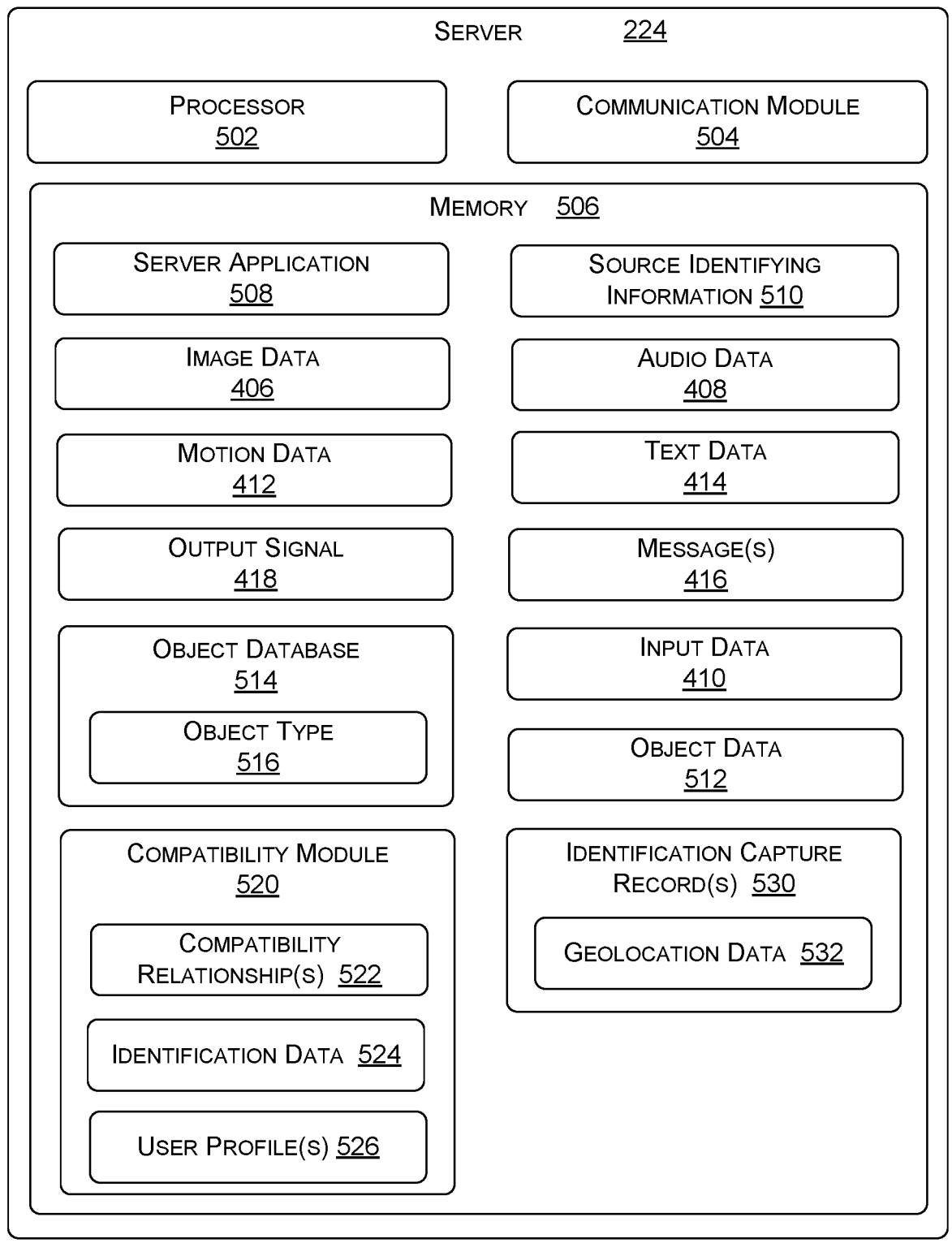
FIG. 5 is a functional block diagram illustrating one example embodiment of a backend device according to various aspects of the present disclosure.

FIG. 5 is a functional block diagram illustrating one embodiment of the server 224 according to various aspects of the present disclosure. The server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the server 224 to access and communicate with devices connected to the network (Internet/PSTN) 212 (e.g., the A/V device 210, the hub device 202, the client devices 214, 216, a device controlled by the security monitoring service 228, the A/V devices 230, and/or the client devices 232).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504. Furthermore, the server application 508 may configure the processor(s) 502 to receive, using the communication module 504, image data 512 (also referred to as "second image data 512") generated by the A/V devices 230.

Although referred to as the server 224 with reference to the processes described herein, the server 224 may additionally, or alternatively, include one or more of the devices from the network(s) of servers/backend devices 220. For example, the processes described herein with respect to the server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the second image data 512.

As described herein, at least some of the processes of the A/V device 210, the hub device 202, and/or the client device 214, 216 may be executed by the server 224. The server 224 includes a compatibility module 520, which stores data and/or software routines for determining compatibility between or among devices. The compatibility module 520 may include compatibility relationship(s) 522, identification data 524, and user profile(s) 526, among other possible information. The compatibility relationship(s) 522 may refer to data and/or logic for determining whether and/or the extent to which two products are compatible with each other. For instance, the compatibility relationship(s) 522 may include a table or database that relates compatible products to each other (e.g., one or more entries, each entry including a field for a first product, a field for a second product, and an indication of the compatibility status between the two products). The compatibility relationship(s) 522 may alternatively or additionally store in one or more tables or databases a list of products and their features (e.g., each entry including an identifier for the product and a feature of that product, where two products having a matching feature are compatible with respect to that feature).

The identification data 524 may refer to one or more unique identifiers associated with a respective one or more products. Each product may be associated with an identifier (e.g., an identification code, product number, universally unique identifier, etc.) for retrieving information about those products. The identification data 524 may include identification information, which information may also be encoded into a barcode, magnetic tag, or the like (through a machine-readable optical or electromagnetic code, product identification number, etc.) that is associated with a product or the packaging of a product. The client device 214/216 may include hardware and/or software for reading the identification information from a label, tag, or barcode. When scanning or capturing the identification information of a product, the client device 214/216 may also store in association therewith metadata indicating the context of the scan or capture event (e.g., when it occurred, where it occurred, etc.). The identification data 524 may store multiple identification events (e.g., scan or capture events) in a table or database, together with the contextual metadata. In some embodiments of the present disclosure, the server 224 may analyze collected identification data 524 to estimate the demand for one or more products, and to determine one or more courses of action to increase the demand and/or sales of the one or more products.

The user profile(s) 526 may include information stored in association with a particular user, client device, computing device, or account that represents at least some of the products that the user owns. A user may have an account or profile that indicates one or more devices within an "ecosystem" or in use on a premises. For instance, within a home security network, a particular user may have an A/V recording and communication device serving as a video doorbell at a front door of a house, a camera-equipped floodlight proximate to a back door of that house, and a wireless speaker device for notifications and alerts. In this example, the user profile(s) 526 may store data indicating that the user's home security system includes those devices. When the user scans an identifier tag of a product and requests, through a client device application, that the server 224 evaluate the compatibility of that product, the server 224 may determine the compatibility status of that prospective product with respect to some or all of the devices registered in association with the particular user's profile 526. In this manner, embodiments of the present disclosure may involve evaluating the compatibility status of a prospective purchase with respect to products that are specifically relevant to the user.

The user profile(s) 526 may be generated and/or updated as users purchase and register their products in association with their respective user profiles. Alternatively, or additionally, the user may select products via a user interface to be evaluated for compatibility (e.g., to accommodate for the situation where a user wishes to purchase multiple devices simultaneously, such that those devices are not owned or registered at the time the compatibility determination is made).

When scanning or capturing the identification information of a product, the client device 214/216 may also store in association therewith metadata indicating the context of the scan or capture event (e.g., when it occurred, where it occurred, etc.). Identification capture record(s) 530 may store multiple identification events or scans in a table or database, together with the contextual metadata. The contextual metadata may include, for example, geolocation data 532 indicating a geographic location or region in which the identification information was captured and/or determined. In some embodiments of the present disclosure, the server 224 may analyze collected identification capture record(s) 530 to estimate the demand for one or more products, and to determine one or more courses of action to increase the demand for and/or sales of the one or more products.

For example, the server application 508 may configure the processor(s) 502 to analyze the image data 406 in order to determine if the image data 406 depicts an object. Objects may include, but are not limited to, people, animals, vehicles, parcels (e.g., packages), electronic devices (e.g., remote control vehicles, drones, etc.), and/or any other type of object that can be depicted by the image data 406 and/or cause motion that can be detected by the A/V device 210. In some examples, the processor(s) 502 of the server 224 may analyze the image data 406 whenever the server 224 receives the image data 406 from the A/V device 210.

In some examples, to analyze the image data 406, computer vision processing and/or image processing, as described herein, for example, may be performed by the processor(s) 502 of the server 224 to determine that the image data 406 depicts one or more objects. For example, in any of the present embodiments, the image data 406 generated by the A/V device 210 may be analyzed to determine object data 512. In some of the present embodiments, one or more of the image data 406, the motion data 412, and the audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the server 224 may compare the object data 512 to an object database 514 to determine what, if any, object(s) the image data 406 depicts in the field of view of the A/V device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person. For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle.

Based on the comparing, the processor(s) 502 of the server 224 may match the object data 512 from the image data 406 to the image data stored in the object database 514. The processor(s) 502 of the server 224 may then use the match to determine that the object data 512 represents an object and/or to determine the type of object 516 that the object data 512 represents. For example, if the processor(s) 502 of the server 224 matches the object data 512 from the image data 406 to image data stored in the object database 514 that represents a person, then the processor(s) 502 of the server 224 may determine that the image data 406 depicts an object and/or that the image data 406 depicts a person. In some examples, when the object data 512 represents multiple objects, the processor(s) 502 of the server 224 may perform a similar analysis to identify each object represented by the object data 512 and/or the respective type of object 516 associated with each of the objects represented by the object data 512.

In some examples, in addition to, or alternatively from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

Although described as being performed in the server 224, in some embodiments, the image data 406 may be analyzed by any of the A/V recording and communication device 210, the hub device 202, and/or the client device 214/216, in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 514, as described with reference to FIG. 5.

The hub device 202 and/or the server 224 (and/or one or more additional or alternative components of the network(s) of servers/backend devices 220) may alternatively be referred to herein as "network devices."

Figure 6:
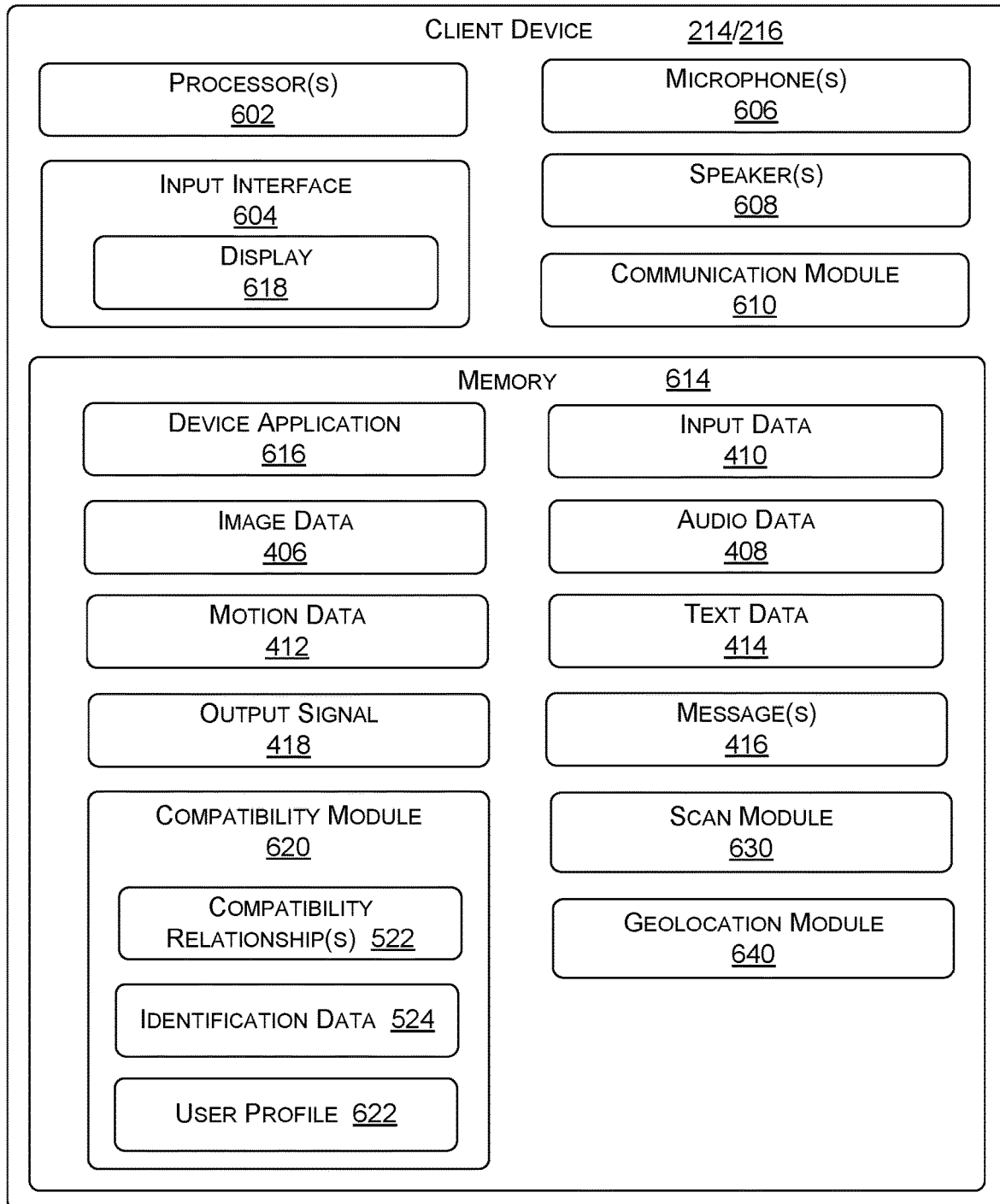
FIG. 6 is a functional block diagram illustrating one example embodiment of a client device according to various aspects of the present disclosure.

Now referring to FIG. 6, FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 612 may store a device application 614. In various embodiments, the device application 614 may configure the processor(s) 602 to receive input(s) to the input interface 604 (e.g., photographs containing barcodes or other optical labels, RFID or NFC tag information, etc.). In addition, the device application 614 may configure the processor(s) 602 to receive, using the communication module 610, the input data 410, the image data 406, the audio data 408, the output signal 418, and/or messages 416 from one or more of the A/V device 210, the hub device 202, or the server 224.

With further reference to FIG. 6, the input interface 604 may include a display 618. The display 618 may include a touchscreen, such that the user of the client device 214, 216 may provide inputs directly to the display 618 (e.g., user interaction with a graphical user interface of a compatibility determination application). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 614 may configure the processor(s) 602 to display the received image data 406 on the display 618 (e.g., display image(s) and/or video footage represented by the image data 406).

As described herein, at least some of the processes of the A/V device 210, the hub device 202, and/or the server 224 may be executed by the client device 214, 216. The client device 214, 216 may include a compatibility module 620, which is similar to the compatibility module 520 described above with respect to FIG. 5. In some embodiments, the client device 214, 216 is configured to store in the local memory 614 the data and software for performing compatibility status determinations, such that communication with the server 224 is not required. The compatibility module 620 may include the compatibility relationship(s) 522 and the identification data 524, which are also described above with respect to FIG. 5. The compatibility module 620 may also include a user profile 622, which may be similar to or the same as one of the user profile(s) 526, described above. The user profile 622 may be specific to a user account associated with the client device 214, 216.

The client device 214, 216 also includes a scan module 630. The scan module 630 may include some combination of software and/or hardware for capturing, scanning, or otherwise reading identification tags, codes, optical labels, or other forms of identification. For example, the scan module 630 may include a camera, and may process the image data 406 of a barcode, QR code, or another optical label to extract identification information therefrom. The scan module 630 may also facilitate wireless or contactless electromagnetic or inductive communication, through some combination of antennas, magnets, integrated circuits, processors, and/or software for decoding signals received through the wireless communication.

Additionally, the client device 214, 216 includes a geolocation module 640, which includes a combination of hardware and/or software for determining a location of the client device 214, 216. The "location" or "geolocation" as described herein may refer to either an approximate or precise geographic location, such as an address, municipality, state, country, satellite-based coordinates, or any other designation of location. The geolocation module 640 may determine the location of the client device 214, 216 based on one or more inputs, including satellite navigation systems, Wi-Fi triangulation, accelerometers, gyroscopes, and/or other positioning systems. In some embodiments, the geolocation module 640 may determine, based on the precise or approximate position of the client device 214, 216, a particular retail store or geographic region (according to predetermined boundary definitions) associated with that position.

The client device 214, 216 may bundle, compile, collate, or otherwise combine the image data 406 and/or the identification information determined by the scan module 630 with contextual information related to the capture of the image data 406 and/or the determination of the identification information. For example, the image data 406 and/or the identification information determined by the scan module 630 may be stored together with the location in which that image data 406 was captured and/or the location in which the identification information was determined, as determined by the geolocation module 640. Additionally, the image data 406 and/or the identification information determined by the scan module 630 may be stored together with the date and/or time in which the image data 406 was captured or the date and/or time in which the identification information was determined. The client device 214, 216 may also combine the image data 406 and/or the identification information with information about the user (e.g., information stored in the user profile 622). Collectively, this contextual data may be transmitted to and stored by the server 224 (e.g., as identification capture record(s) 530).

Figure 7:
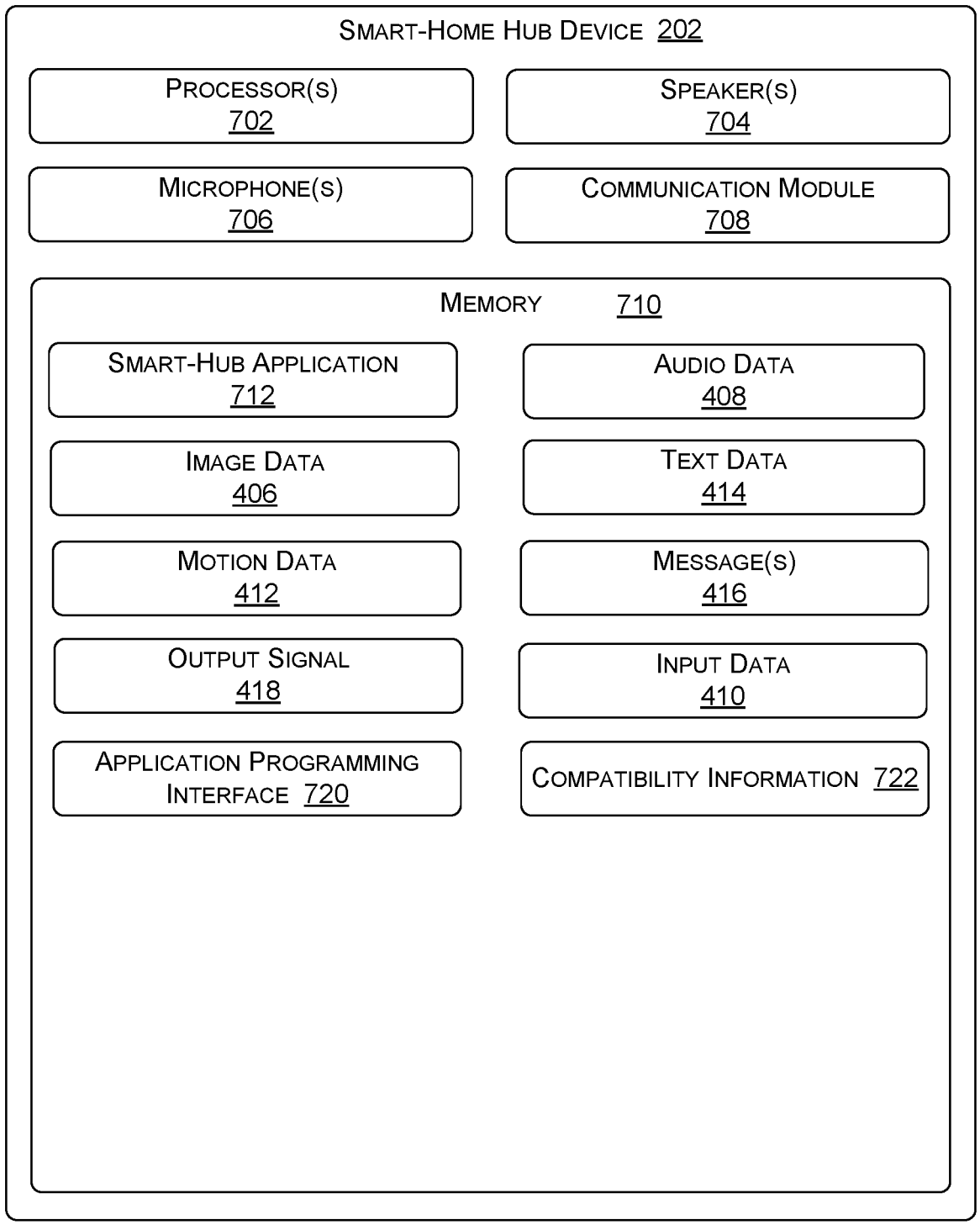
FIG. 7 is a functional block diagram illustrating one example embodiment of a smart-home hub device according to various aspects of the present disclosure.

FIG. 7 is a functional block diagram illustrating an embodiment of the smart-home hub device 202 (alternatively referred to herein as the "hub device 202") according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 310) that are operatively connected to speaker(s) 704, microphone(s) 706, a communication module 708 (which may be similar to, and/or include similar functionality as, the communication module 310), and memory 710 (which may be similar to, and/or include similar functionality as, the memory 402). In some embodiments, the hub device 202 may further comprise one or more of a camera (not shown). In some embodiments, the hub device 202 may not include one or more of the components shown in FIG. 7, such as the speaker(s) 704 and/or the microphone(s) 706.

As shown in the example of FIG. 7, the memory 710 stores a smart-home hub application 712. In various embodiments, the smart-home hub application 712 may configure the processor(s) 702 to receive sensor data from the sensors 204 and/or the automation devices 206. For example, the sensor data may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 7, the smart-home hub application 712 may configure the processor(s) 702 to receive the audio data 408, the text data 414, the image data 406, the motion data 412, the input data 410, and/or the messages 416 from the A/V device 210 (in some embodiments, via the server 224) using the communication module 708. For example, the hub device 202 may receive and/or retrieve (e.g., after receiving a signal from the A/V device 210 that the A/V device 210 has been activated) the image data 406, the input data 410, and/or the motion data 412 from the A/V device 210 and/or the server 224 in response to motion being detected by the A/V device 210. The smart-hub application 712 may then configure the processor(s) 702 to transmit, using the communication module 708, the audio data 408, the text data 414, the image data 406, the motion data 412, the input data 410, and/or the messages 416 to the client device 214, 216, the server 224, and/or an additional electronic device (e.g., a second A/V device 210, the automation device(s) 206, the sensor(s) 204, etc.).

As described herein, at least some of the processes of the A/V device 210, the server 224, and/or the client device 214, 216 may be executed by the hub device 202. The smart-home hub device 202 includes an application programming interface (API) 720, which is similar to the API 420 described above with respect to FIG. 4. The API 720 includes a set of functions, methods, webhooks, and/or other externally-accessible and/or private function calls for obtaining information about the smart-home hub device 202, controlling the smart-home hub device 202, configuring the smart-home hub device 202, and/or transmitting signals, messages, or commands to other devices communicatively coupled to the smart-home hub device 202.

For instance, the API 720 might include a function call for "arming" a home security system comprised of the smart-home hub device 202 and other security devices around the home, such as window sensors, door sensors, motion sensors, A/V recording and communication devices, and/or other security devices. If, for example, the client device 214, 216 activates that "arming" function of the API 720, the smart-home hub device 202 may responsively transmit a command to some or all of the security devices in the system to transition into an "armed" mode. Because each of the security devices may include its own messaging scheme, standard, or API, the API 720 of the smart-home hub device 202 may be configured to create and transmit commands in each of the security device's respective "language."

In this manner, the API 720 of the smart-home hub device 202 may augment the compatibility status between two or more devices, by serving as a communication intermediary or translator between different message schemes or API function calls. Thus, the determination of compatibility between two or more devices may depend on the existence of another device within a particular security system (e.g., the compatibility status between device A and device B is "incompatible" unless device C is present and facilitates interoperability between devices A and B). In some embodiments, determining compatibility may involve first determining whether one or more such "intermediary" devices, such as the smart-home hub device 202, exists within the system.

The API 720 may be updated or modified through software updates to the smart-home hub device 202 itself, or through changes in a backend server's communication to which the API 720 communicates. Some function calls of the API 720 may be partially or completely carried out by a backend server, or may access data from a backend server or Internet service. Thus the capabilities of the API 720—and therefore its compatibility with other devices—may vary depending on its version and/or the capabilities of the backend server or servers on which the API 720 depends.

In some embodiments of the present disclosure, a client device or backend server determines the extent to which a network hardware device is compatible with a home security hub of the home security network. Because the functionality and operation of the home security hub—which may be the same as or similar to the smart-home hub device 202—can change over time (e.g., function calls deprecated, external services integrated, API calls modified or extended, etc.), the compatibility status of the network hardware device with respect to the home security hub is not static, but instead may change on a regular basis. The changes in compatibility may not be observable, or at least not easily observed by a typical consumer who lacks the knowledge about software updates to the home security hub and/or to the servers on which the hub depends.

The smart-home hub device 202 may also include compatibility information 722. The compatibility information 722 may include any combination of compatibility relationships (such as the compatibility relationship(s) 522 described above with respect to FIG. 5), identification data (such as the identification data 524 described above with respect to FIG. 5), and/or compatibility information related to the devices communicatively coupled with the smart-home hub device 202 (similar to the user profile(s) 526 described above with respect to FIG. 5).

FIGS. 8-14 illustrate various processes 800, 900, 1000, 1100, 1200, 1300. Each of the processes described herein, including the processes 800, 900, 1000, 1100, 1200, and 1300, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

In the proceeding description of the processes 800, 900, 1000, 1100, and 1200, the "client device" may be similar to or the same as the client device 214, 216 described above with respect to FIGS. 2 and 6. Likewise, the "server computing device" may be similar to or the same as the server 224 described above with respect to FIGS. 2 and 5. Additionally, "security hub device," "home security hub," and "hub device" may each refer to a device similar to or the same as the smart-home hub device 202 described above with respect to FIG. 7.

Figure 8:
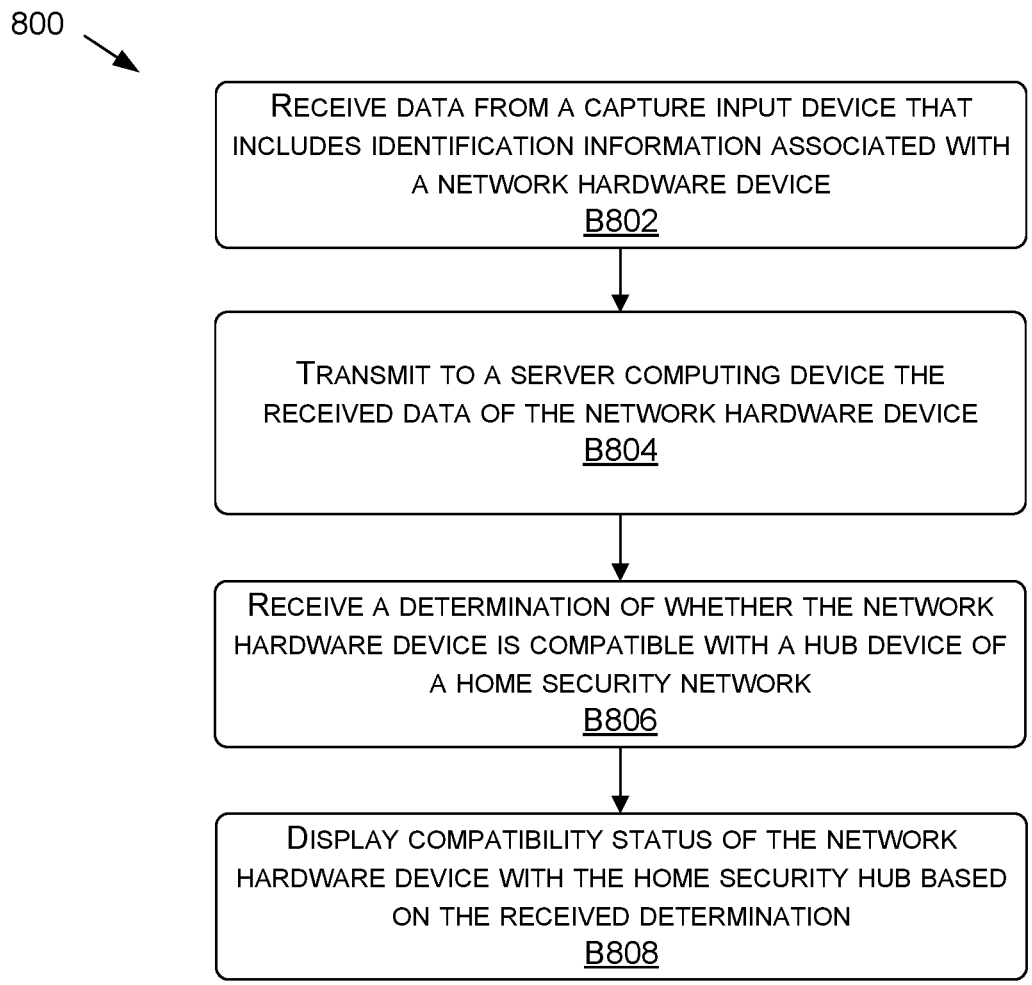
FIGS. 8-11 are flowcharts illustrating example processes for determining compatibility of a network hardware device, according to various aspects of the present disclosure.

FIG. 8 is a flowchart illustrating an example process 800 for determining compatibility of a network hardware device for connecting to a home security network, according to various aspects of the present disclosure. The client device 214, 216 may perform one or more aspects of the process 800. The client device 214, 216, at block B802, receives data from a capture input device that includes identification information associated with a network hardware device. The capture input device may be a camera of a client device that obtains image data, or may be an electromagnetic or inductive scan device embedded within the client device that obtains signals from reading electromagnetic or inductive tags. The identification information may be extracted from the image data or the scanned signals by an integrated circuit, processor, recognized through image processing, and/or decoded from an encoded signal. The tag or label that contains the identification information may be affixed to product packaging or to a display associated with the product in a retail store, for example.

The client device 214, 216, at block B804, transmits, to a server computing device, the received data of the network hardware device. The transmission may occur over a wide area network, such as the Internet, to which both the client device and the server computing device are connected. The data transmitted may include the identification information, and, in some embodiments, contextual metadata associated with the client device, the user of the client device, and/or the context in which the identification information was obtained and/or determined.

The client device 214, 216, at block B806, receives a determination of whether the network hardware device is compatible with a hub device of a home security system. The home security hub may be a central communication device that establishes a home security network and/or facilitates communication among devices within the security system. The determination of whether the network hardware device is compatible with the home security hub may involve a determination of whether the network hardware device can be communicatively coupled to the home security hub in accordance with the techniques disclosed in the present application.

The client device 214, 216, at block B808, displays the compatibility status of the network hardware device with the home security hub based on the received determination. For example, the client device may provide a graphical user interface (GUI) to the user, which includes text and/or graphical representations of the compatibility status of the network hardware device at least with respect to the home security hub. The GUI may also include additional information, such as related product recommendations and information about upcoming product releases.

Figure 9:
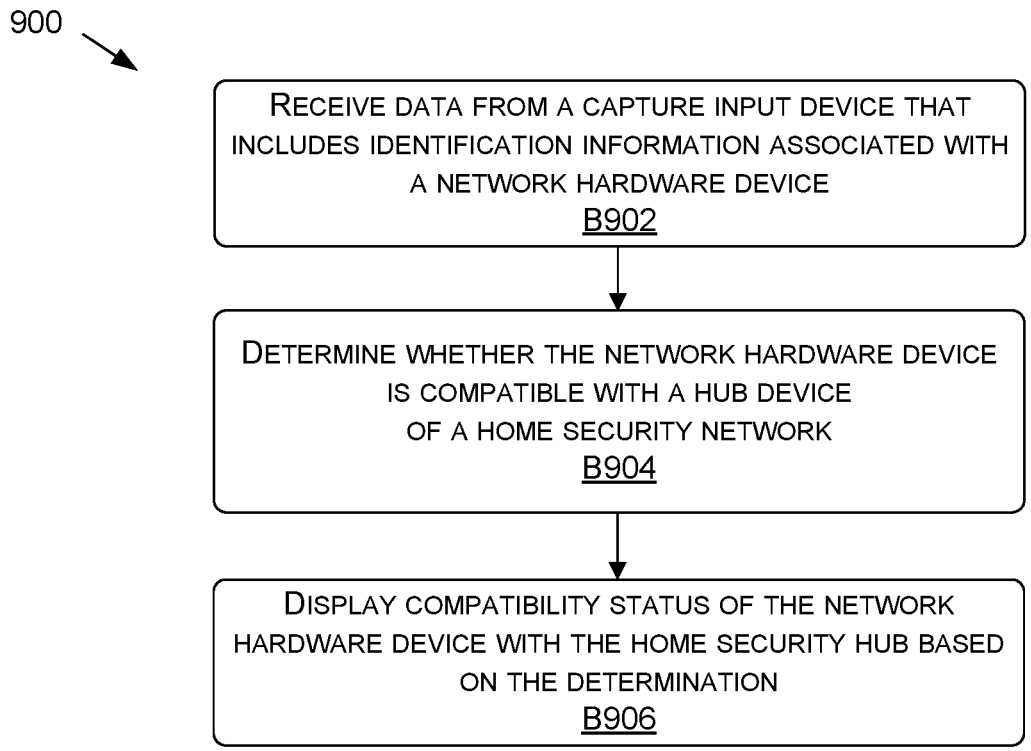

FIG. 9 is a flowchart illustrating an example process 900 for determining compatibility of a network hardware device for connecting to a home security network, according to various aspects of the present disclosure. In this example, the process 900 may be performed by the client device 214, 216 without backend server processing. The client device 214, 216, at block B902, receives data from a capture input device that includes identification information associated with a network hardware device. Block B902 may be similar to or the same as block B802 described above with respect to FIG. 8.

The client device 214, 216, at block B904, determines whether the network hardware device is compatible with a hub device of a home security network. Block B904 may be similar to block B806 described above with respect to FIG. 8, except that block B904 may be carried out locally on the client device without backend server communication.

The client device 214, 216, at block B906, displays the compatibility status of the network hardware device with the home security hub based on the determination. Block B906 may be similar to or the same as block B808 described above with respect to FIG. 8.

Figure 10:
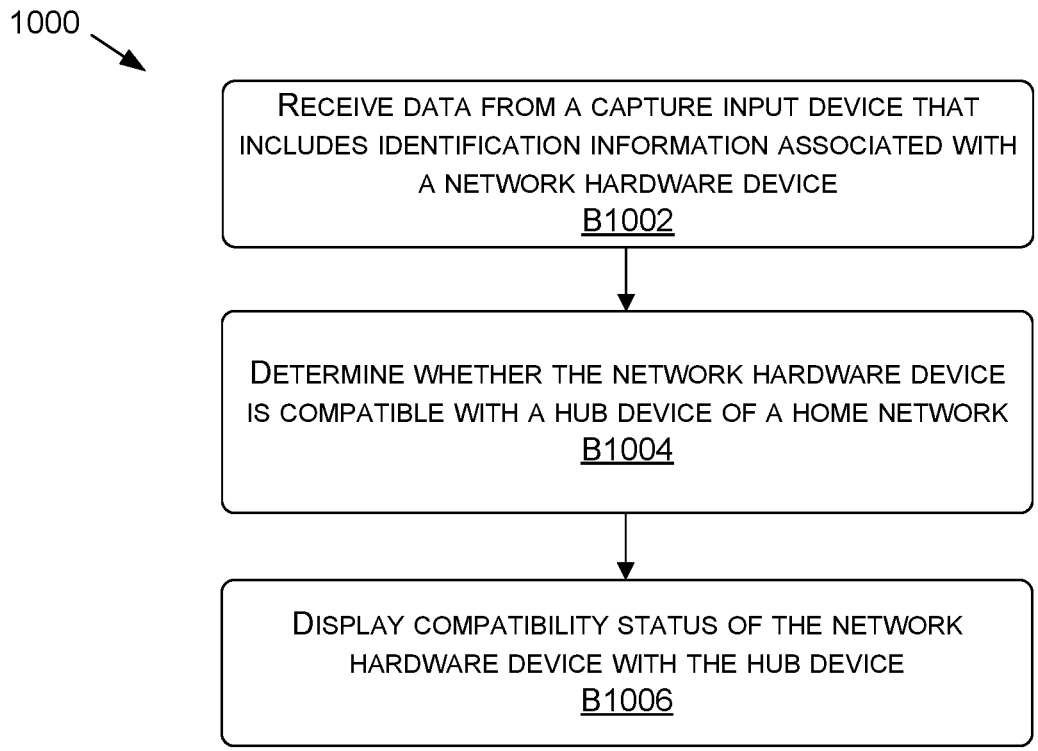

FIG. 10 is a flowchart illustrating an example process 1000 for determining compatibility of a network hardware device for connecting to a home network, according to various aspects of the present disclosure. The client device 214, 216 may perform one or more aspects of the process 1000. The client device 214, 216, at block B1002, receives data from a capture input device that includes identification information associated with a network hardware device. Block B1002 may be similar to or the same as block B802 described above with respect to FIG. 8.

The client device 214, 216, at block B1004, determines whether the network hardware device is compatible with a hub device of a home network. The determination of whether the network hardware device is compatible with the hub device may involve a determination of whether the network hardware device can be communicatively coupled to the hub device in accordance with the techniques disclosed in the present application. In this example, the hub device may be a communication hub that is not necessarily for facilitating communication in a security system. For instance, the hub device may be a communication hub for a home automation system that controls elements of a user's home, such as thermostats, lighting, and/or other devices.

The client device 214, 216, at block B1006, displays the compatibility status of the network hardware device with the hub device. Block B1006 may be similar to or the same as block B808 described above with respect to FIG. 8.

Figure 11:
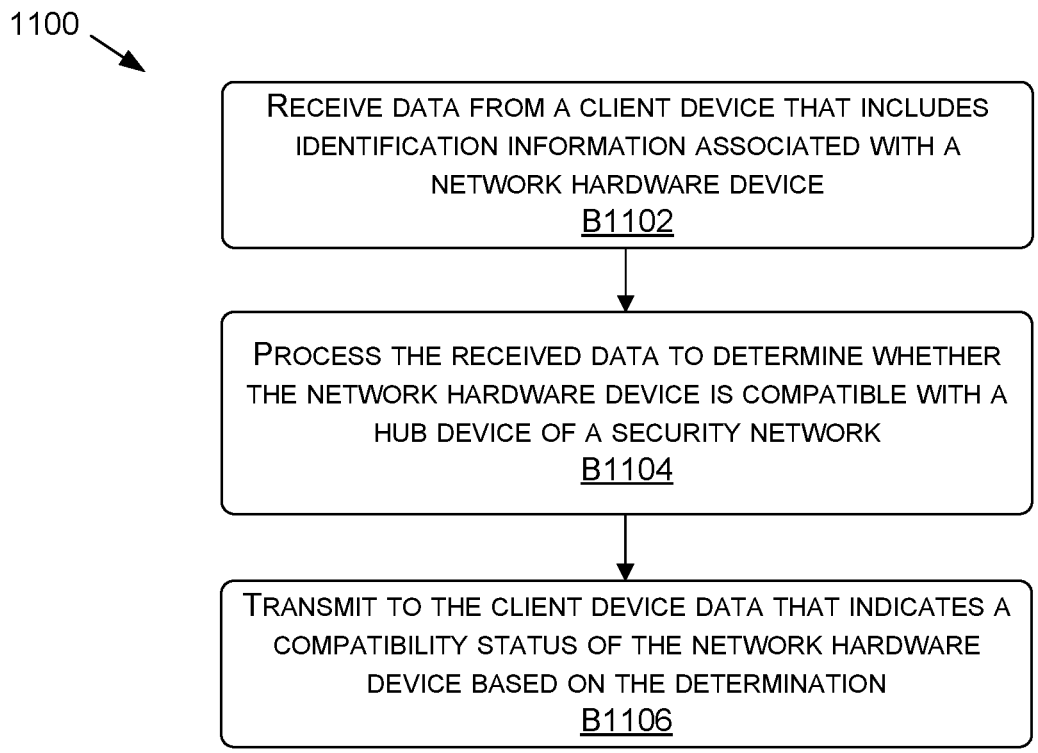

FIG. 11 is a flowchart illustrating an example process 1100 for determining compatibility of a network hardware device for connecting to a security hub device, according to various aspects of the present disclosure. The server 224 may perform one or more aspects of the process 1100. The server 224, at block B1102, receives data from a client device that includes identification information associated with a network hardware device. The client device may have obtained or decoded the identification information from image data, electromagnetic communication, and/or inductive communication with a tag or label associated with the network hardware device.

The server 224, at block B1104, processes the received data to determine whether the network hardware device is compatible with a hub device of a security network. The determination of whether the network hardware device is compatible with the security hub device may involve a determination of whether the network hardware device can be communicatively coupled to the hub device in accordance with the techniques disclosed in the present application. In this example, the security hub device may be a communication hub that is not necessarily for facilitating communication in a home security system, but may be used for security systems in the workplace, a commercial building, a public space, and/or other premises. At block B1104, the server 224 may also determine whether the network hardware device is compatible with additional or alternative devices. For example, the server 224 may determine whether the network hardware device is compatible with one or more devices registered or associated with the user or user's account associated with the client device.

The server 224, at block B1104, may determine compatibility between the network hardware device and the security hub device (and/or other devices) based on syntactic interoperability, semantic interoperability, physical characteristics, API function calls, communication protocol(s), and/or other features, as described above. For instance, the compatibility between the network hardware device and the security hub device may depend on the extent to which the security hub device can communicate with and/or control aspects of the network hardware device (e.g., over a particular communication protocol through API function calls), and/or the extent to which the network hardware device can send and receive information through the security hub device.

The server 224, at block B1106, transmits, to the client device, data that indicates a compatibility status of the network hardware device based on the determination. For example, the compatibility status may include some combination of text, graphics, and/or other information that can be used by another computing device to convey in a user interface the extent of compatibility between the network hardware device and the security hub device.

Figure 12:
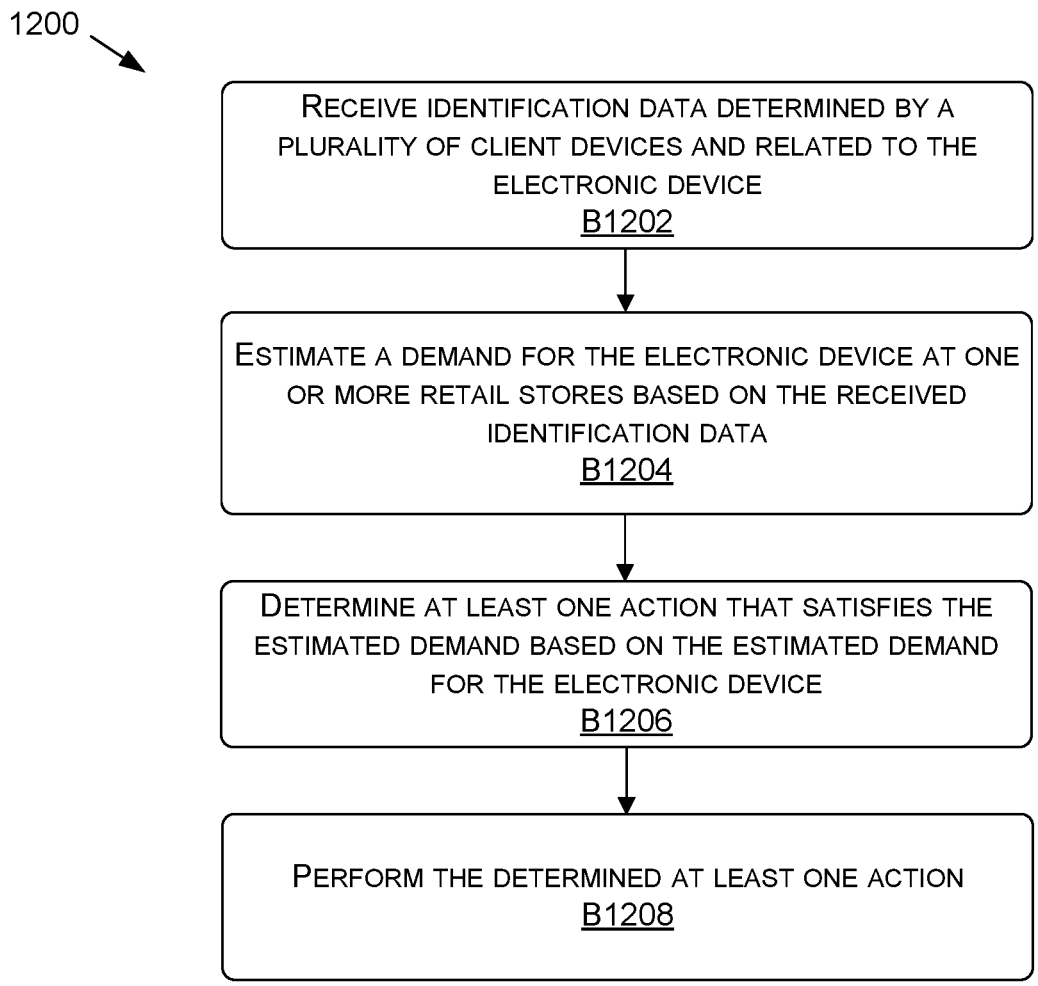
FIG. 12 is a flowchart illustrating an example process for assessing product demand based on user compatibility checks, according to various aspects of the present disclosure.

FIG. 12 is a flowchart illustrating an example process 1200 for assessing demand for an electronic device according to user compatibility checks of the device, according to various aspects of the present disclosure. The server 224 may perform one or more aspects of the process 1200. The server 224, at block B1202, receives identification data determined by a plurality of client devices and related to the electronic device. Here, the identification data may include information related to the capture or determination of the identification data by the respective plurality of client devices. This information may include contextual metadata, such as the time, date, and/or location in which the identification information was determined. The contextual metadata may also include information about the user.

The server 224, at block B1204, estimates a demand for the electronic device at one or more retail stores based on the received identification data. The "demand" for the device may refer to any metric or indication of consumer interest (or lack of interest) in purchasing the electronic device. For example, the demand for the electronic device may be inferred from the frequency and/or number of identification data scans at the one or more retail stores. A high number of identification data scans (e.g., relative to a threshold number) may represent a large demand for the electronic device. Conversely, a low number of identification data scans (e.g., relative to another threshold) may represent a low demand for the electronic device. Other parameters may also be used to estimate the demand for the electronic device.

The server 224, at block B1206, determines at least one action that satisfies the estimated demand based on the estimated demand for the electronic device. The "action" may be any communication, notification, or system modification intended to affect the sales of the electronic device. For instance, a high demand for the electronic device at a particular retail store may indicate that the retail store should increase its in-stock quantity of that electronic device. The at least one action may include notifying the retail store, notifying the manufacturer, and/or automatically adjusting the supply chain of the electronic device to effect an increased distribution of that electronic device to the retail store. As another example, a low demand for the electronic device at a particular retail store may indicate that the retail store and/or manufacturer should make efforts to increase consumer attention on the product. In this example, the at least one action may involve notifying the retail store to move the location of the product within the store to be more visible to consumers, and/or informing the manufacturer to secure advertising time or space in proximity to the retail store (e.g., billboards, television commercials, geographically-targeted social media advertisements, etc.).

The server 224, at block B1208, performs the determined at least one action. As described above, the determined at least one action may involve transmitting information to one or more stakeholders associated with the manufacture, sale, and/or distribution of the electronic device. In some cases, the at least one action might involve automatically modifying some aspect of a system (e.g., automatically purchasing digital advertising in a geographic region associated with low-demand retail stores). Other examples are also possible.

Figure 13:
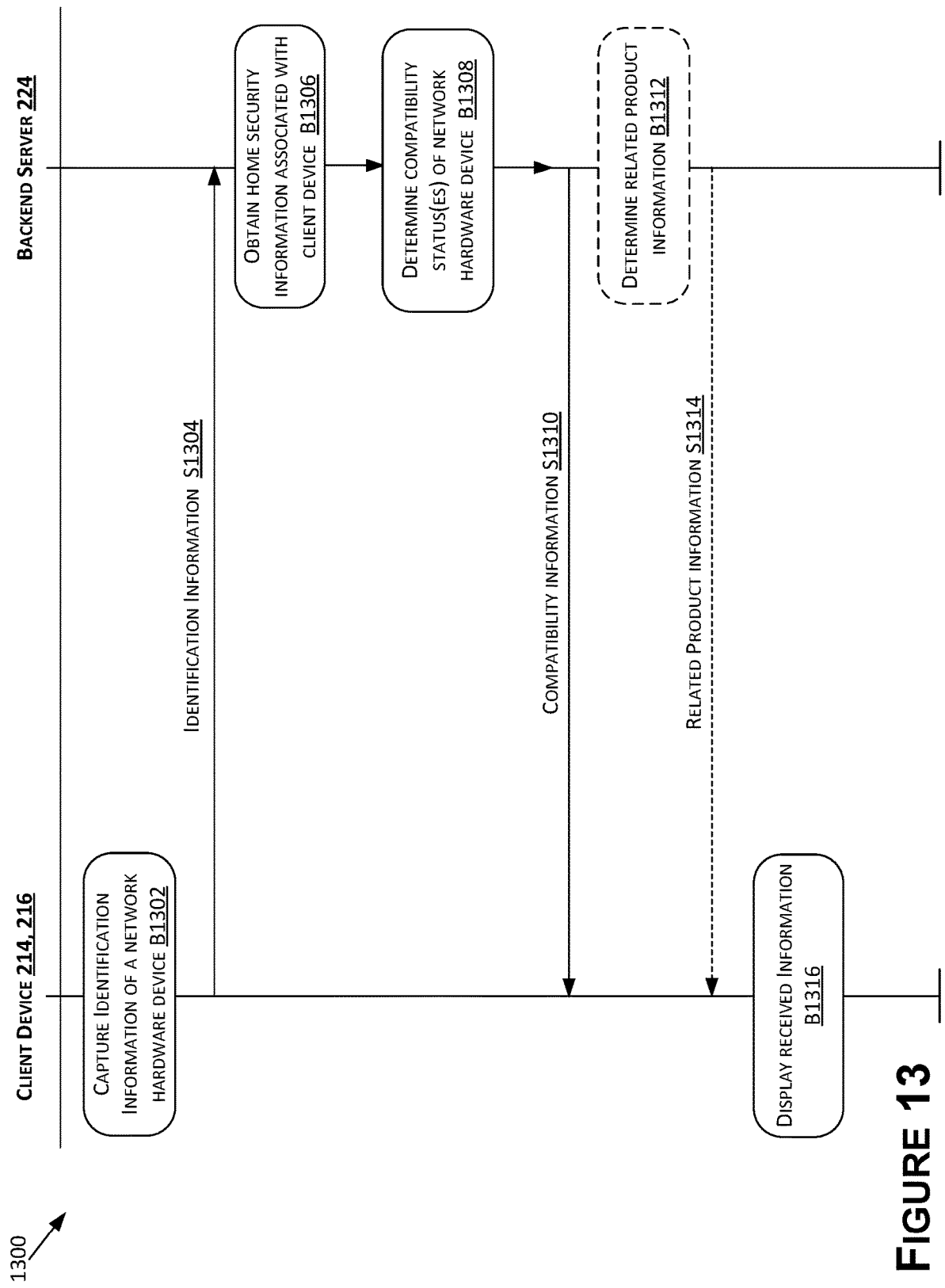
FIG. 13 is a sequence diagram of a process for determining compatibility information of a network hardware device, according to various aspects of the present disclosure.

FIG. 13 is a sequence diagram of a process 1300 for determining compatibility status(es) of a network hardware device and related product information, according to various aspects of the present disclosure. The client device 214, 216, at block B1302, captures identification information of a network hardware device, and transmits that identification information to the server 224 at signal S1304.

The server 224, at block B1306, obtains home security information associated with the client device or a user account. The home security information may be included in a user profile associated with a user of the client device 214, 216, which profile may be similar to or the same as the user profile 622 described above with respect to FIG. 6. The server 224 then, at block B1308, determines compatibility status(es) of the network hardware device with respect to one or more devices described in the home security information. For example, a compatibility status may be determined for each of the devices registered to a user's account. The compatibility information—including one or more compatibility statuses—is transmitted by the server 224 to the client device 214, 216 at signal S1310.

In some embodiments, the server 224 also determines, at block B1312, related product information. The related product information may include a combination of information about upcoming product releases and/or product recommendations. For example, a new iteration of the network hardware device may be scheduled for release within a week. The related product information may notify the user of the upcoming product release, so that the consumer can decide whether to purchase the current iteration or the upcoming iteration of the network hardware device. The related product information may also include product recommendations based on the scanned network hardware device. For example, the network hardware device may be commonly purchased with other products, such as aftermarket cosmetic items, additional batteries, and/or other security devices. The related product information may provide such recommendations to the user in addition to the compatibility information. The server 224 transmits the related product information to the client device 214, 216 at signal S1314.

The client device 214, 216, at block B1316, after receiving the compatibility information and/or the related product information, displays at least some of that received information to notify the user of relevant compatibility status(es) and/or of other potential products of interest to the user.

Figure 14:
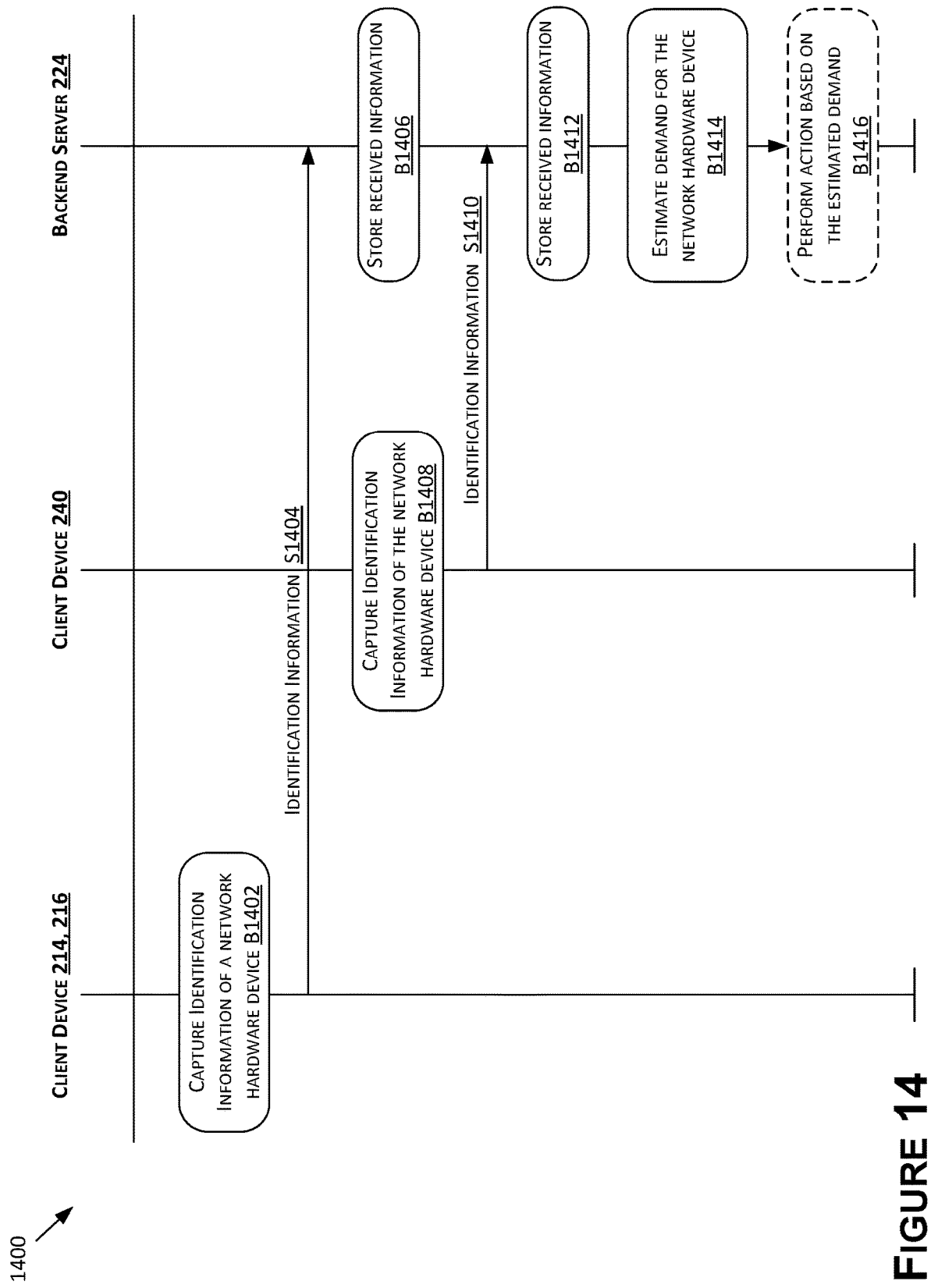
FIG. 14 is a sequence diagram of a process for estimating product demand, according to various aspects of the present disclosure.

FIG. 14 is a sequence diagram of a process 1400 for increasing sales of a network hardware device, according to various aspects of the present disclosure. In some embodiments of the present disclosure, a server may store information related to the capture of identification information of products by the client devices of consumers over time. The collected data may include contextual metadata that contains information about the time, date, location, and/or user that captured the identification information. In the aggregate, this data can be analyzed to identify trends, anticipate consumer demand for products, inform supply chain decisions, and/or guide advertising campaigns.

The client device 214, 216, at block B1402, captures identification information of a network hardware device, which is transmitted to a server 224 at signal S1404. The server 224 stores this received identification information from the signal S1404, which includes contextual metadata related to the capture of the identification information.

A different client device 240, at block B1408, similarly captures identification information of the network hardware device, which is transmitted to a server 224 at signal S1410. The server 224, at block B1412, stores the received identification information, together with contextual metadata related to the capture of the identification by the client device 240.

Other client devices (not shown) may similarly scan network hardware devices (the same network hardware device or other devices) and provide contextual metadata associated with those scan events to the server 224.

Collectively, the captured identification information and its associated contextual metadata are used by the server 224 to estimate, at block B1414, demand for the network hardware device. The "demand" for the device may refer to any metric or indication of consumer interest (or lack of interest) in purchasing the network hardware device. The server 224 may subsequently perform some action based on the estimated demand at block B1416.

For example, a retail store may include a display with a scannable barcode that is separate from the product packaging for the network hardware device. Users may scan that barcode, even if the network hardware device itself is out of stock at that particular retail store. In this example, a comparatively high number of scans at that retail store relative to the quantity of network hardware devices at that retail store may indicate that the demand for that network hardware device is greater than the supply to that retail store. The "action" performed by the server 224, in this example, may involve notifying the retail store to order more network hardware devices and/or notifying a manufacturer of the network hardware devices to supply more of the devices to that particular retail store. The "action" may also be an automated supply chain response, in which the number of network hardware devices to be shipped to that particular retail store is algorithmically determined; in such implementations, the "action" performed may involve modifying a quantity of network hardware devices for an upcoming shipment to that retail store. Other actions are also possible.

As another example, two or more products or devices may be commonly purchased as a pair. The demand for a particular product may therefore be related to or depend on the demand for another related product. Thus, the server 224 may estimate the demand for the network hardware device based on aggregated identification information of another device.

In addition, the lack (or low number of) identification information for the network hardware device may correlate with a lack of demand for that network hardware device, at least with respect to a particular period of time, region, and/or retail store. If fewer than a threshold number of scans have occurred at a particular retail store or within a particular region, the server 224 may determine that increasing sales of the network hardware device for that store or region involves bolstering marketing efforts or increasing advertising around that store or region. Thus, the estimated "demand" for the network hardware device may be determined based on a relatively low number of scan events—compared to a threshold number per unit time or compared to the number of scan events in other regions. The "action" to perform in this example may involve launching or increasing advertising efforts in the region associated with low demand. Many media outlets and social media platforms offer geographically-targeted advertising campaigns. The server 224 may secure advertising space or time with a geographic designation selected based on the low demand regions for the network hardware device.

Regardless of the particular demand metrics used or actions performed, embodiments of the present disclosure may, in addition to determining the compatibility statuses among devices, store the data associated with the scan events used in determining those compatibility statuses. That data may server as the basis for evaluating product demand and inform decisions about product distribution, advertising, and other business operations.

As devices continue to grow in complexity, become increasingly connected to each other, and depend on processing by other computing devices or servers, consumers face substantial challenges in understanding device compatibility and interoperability. The extent of compatibility among devices may be a significant factor influencing the purchasing decisions of consumers. There is a need, particularly in home automation and security systems, to have a high level of interoperability among all of those devices, as a lack of synergy among the devices can create complications and frustrations for the user. As more software developers move toward an "agile" development cycle, software updates (which impact the functionality of devices within a system) continually shift the compatibility and interoperability among devices.

Embodiments of the present disclosure address this problem by determining the compatibility status between two or more devices by comparing their physical features, APIs, and/or other specifications. In some embodiments, the determination of compatibility considers other devices or services, such as backend server functionality and/or the existence of a communication hub within a system that facilitates communication among devices. A consumer can scan a product's tag or barcode using a client device application, which either determines or receives the compatibility status of that product with respect to one or more products. The application may also inform the user of recommended products and/or upcoming product releases. In this manner, the user's shopping experience is simplified, and the user can be informed how well a given product operates within the user's "ecosystem" (e.g., home automation system, home security system, commercial security system, etc.).

Figure 15A:
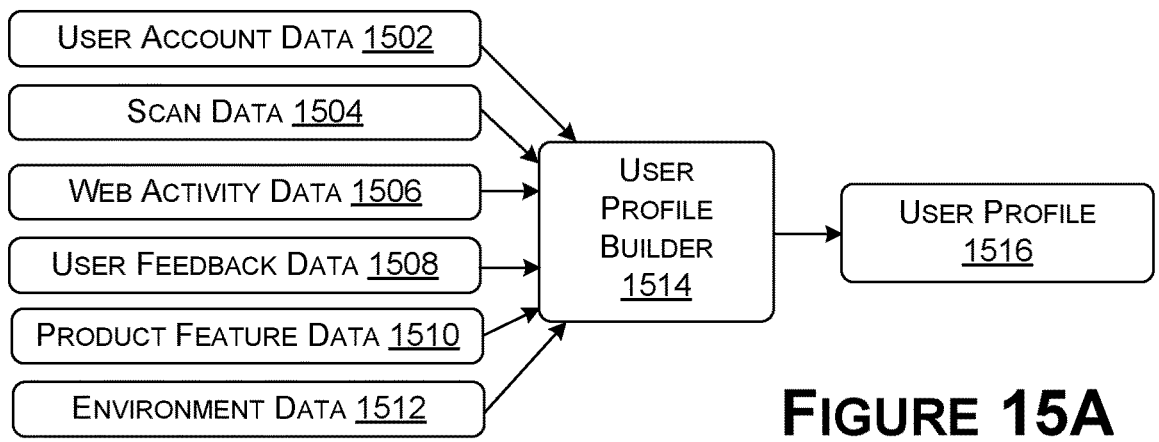
FIGS. 15A-15D are functional block diagrams of example systems for determining and utilizing user preferences and interests, according to various aspects of the present disclosure.
Figure 15B:
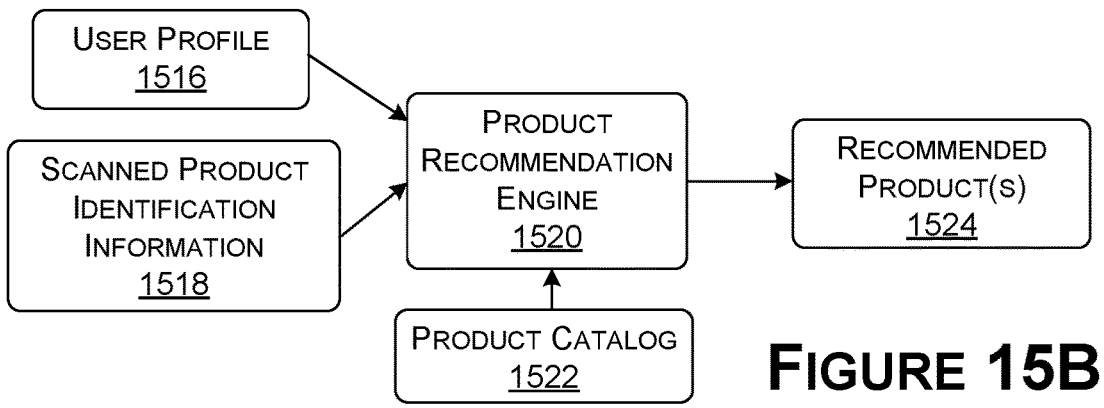
Figure 15C:
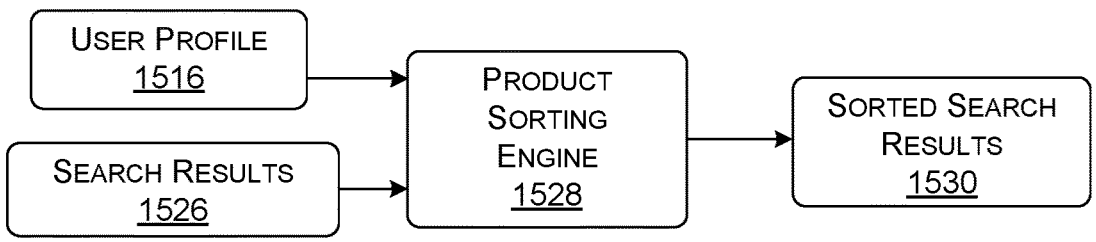
Figure 15D:
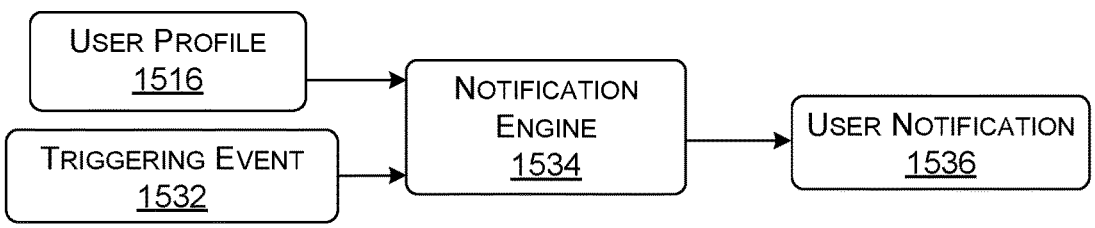

FIGS. 15A-15D are functional block diagrams illustrating example systems for determining user preferences and interests (FIG. 15A), and applying the determined user preferences and interests to provide product recommendations (FIG. 15B), sort search results (FIG. 15C), and generate notifications (FIG. 15D). The user profile 1516 described below may be similar to or the same as a user profile of the user profile(s) 526 described above with respect to FIG. 5, and/or the user profile 622 described above with respect to FIG. 6. For the purpose of the following description, the user profile 1516 may refer to any representation of the user's interests, preferences, capabilities, and/or other user-specific information. Any of the embodiments described with reference to FIGS. 15A-15D may be implemented by a server and/or a network of computing devices, such as the backend device 102, the network 116, the networks 212, 218, 220, the remote storage devices 222, the server(s) 224, the APIs 226, etc. in some embodiments, a home security company or organization may provide a service that monitors information about the user's home security system, the user's environment, and/or the user's shopping activity to provide an enhanced and personalized shopping experience for the user, while simultaneously recommending to the user ways in which to improve their home security system.

As shown in FIG. 15A, a user profile builder 1514 generates the user profile 1516 based on input information, including at least one of user account data 1502, scan data 1504, web activity data 1506, user feedback data 1508, product feature data 1510, and environment data 1512, among other types of information. The user profile builder 1514, which may include models, relationships, networks, algorithms, and/or other data processing units, processes the input information to determine aspects of the user profile 1516.

For example, the user profile builder 1514 may include a model that learns or infers a particular user's aesthetic preferences based on the input information. This aesthetic determination model may, for instance, include a convolutional neural network (CNN) that processes images (e.g., photos captured to determine the scan data 1504, images of the products associated with the user account data 1502 in product feature data 1510, images from products that the user has viewed in the web activity data 1506, etc.). The model may output data indicative of the user's preferred aesthetic (e.g., colors, geometries, etc.).

As another example, the user profile builder 1514 may include a relationship for determining whether there are any unpurchased products that the user appears to be interested in purchasing. This product interest relationship may, for instance, process all the data from the data elements 1502-1512 that correspond to a particular type of product (e.g., door locks, video doorbells, security cameras, etc.), and weight each of those data elements based on their temporal proximity to the present time and whether the user has purchased or already owns a product of that particular type. For example, the relationship may determine a comparatively higher weight for a scan event that occurred a week ago for a type of door lock that is not present in the user's system (according to the user account data 1502), compared to a web search for security cameras that was conducted a year ago, where the user installed at least one security camera in the interim between that web search and the present time. The product interest relationship may also include a model for inferring whether the user already owns the product, if that information cannot be immediately determined form the user account data 1502. For example, the user may purchase a product as a gift, which may be determined based on data indicating that the user purchased the product but did not install that product in his or her home security system.

As yet another example, the user profile builder 1514 may include a model for estimating the technical and mechanical capabilities of a particular user. This model may extract information from the data elements 1502-1512, such as the web sites or stores in which that the user has shopped and/or scanned items. Additionally, the model may extract general information about the user, such as the user's age, gender, and/or other information about the user (e.g., provided in a survey and stored as user feedback data 1508, information about the user's home stored in the user account data 1502, etc.). Based on this extracted information, the model may estimate the user's technical and/or handiwork capabilities. For example, the model may determine that a user that frequently shops at home improvement stores likely has more experience in handiwork than a different user that frequently shops at home goods stores. As another example, the model may estimate that a younger user likely has more experience installing and working with smartphone applications compared to older users. Additionally, the model may estimate the user's capabilities based on feedback provided from the user directly, such as in response to a customer survey. Based on all of this information, the model may generate a score or other representation of the user's capabilities. These capabilities may be broken down into multiple categories, such as mechanical construction, electrical wiring, software configuration, and/or other possible categories.

In addition to the above, the user profile builder 1514 may encode various pieces of information that generally describe the user, the user's home security and/or home automation system, the user's neighborhood (or the type of premises, if the security system is for a business or non-home premises), and/or other information related to the user. For instance, the user profile builder 1514 may generate—and, in some cases, periodically update—potential security risks associated with the user's location, home, and/or neighborhood. If the user's neighborhood is associated with a high rate of break-ins, for example, the user profile builder 1514 may encode information about the type of crime (and/or a value representing its rate of occurrence) into the user profile 1516, which may subsequently serve as a basis for making product recommendations to the user to enhance the user's home security. The user profile builder 1514 may generally store in the user profile 1516 other information about the home (e.g., the number of doors, the number of windows, etc.), which may subsequently be used to determine whether a particular security need has been satisfied (e.g., if the user has a front door and a back door, and the user purchases only one security camera or A/V recording and communication device, then the system may continue to make recommendations for security cameras even after the purchase of the single security camera or A/V recording and communication device).

The user profile builder 1514 may also update the user profile 1516 over time. For instance, certain types of information used to build the user profile 1516 may become less relevant over time (e.g., indicative of products that the user is no longer interested in). Thus, the user profile 1516 may be updated periodically. Additionally, or alternatively, the user profile builder 1514 may rebuild or update the user profile 1516 responsive to receiving new input data. For example, if the user performs a scan event that is appended to the scan data 1504, the storage of the data associated with that scan event may trigger the updating or rebuilding of the user profile 1516 by the user profile builder 1514.

The user account data 1502 may include information stored in association with a user's account with, e.g., a home security company or cloud service, for example. The user account data 1502 may store information about the products owned by and/or installed around the user's home, office, and/or other premises. The user account data 1502 may also include bibliographic information about the user, such as that user's age and/or gender. Furthermore, the user account data 1502 may store the location (e.g., address or coordinates) of the user's home, office, and/or other premises.

The scan data 1504 may include information stored in relation to the scan events for a particular user, including an image captured (e.g., the image from which a barcode or QR code was read), a date and/or time at which the scan event occurred, the location at which the scan event occurred, the identification information of the scanned product, and/or other information. The scan data 1504 may include, for example, images and/or data respective of one or more identification tags 116 (see FIG. 1) and/or identification data 524 (see FIG. 5).

The web activity data 1506 may include any user behavior data of a particular user, such as the user's web searches, clicks, the user's addition of specific products to e-commerce shopping carts and/or "wish lists," and/or any other web-based or app-based activity of the user.

The user feedback data 1508 may include information supplied directly by the user in relation to the purchase of a particular product, or user-provided feedback generally. For example, a client device application may request that the user provide feedback about a product that they purchased and installed (e.g., "On a scale of 1 to 10, how simple was the installation?"). As another example, a company may transmit an electronic survey (e.g., over email) to the particular user to obtain customer feedback about one or more products. Regardless of the manner in which the feedback is collected, the user feedback data 1508 may include information directly expressed by the user.

The product feature data 1510 may include information extracted from product listings, specifications, images, and/or other publicly-available (known to a particular entity) information about one or more products. Some or all of the product feature data 1510 may be determined by models, relationships, and/or other data processing elements not explicitly shown in FIG. 15A. For instance, aesthetic qualities about products may be determined using an image processing neural network trained to extract one or more features, such as a product's smoothness, color, overall shape, and/or other aesthetic features. As another example, the installation difficulty of a product may be determined using some combination of image processing and text analysis (e.g., the number of installation steps, identification of certain objects such as unsheathed A/C power wires, user reviews expressing installation ease or difficulty, etc.). Systems of the present disclosure may encompass such data processing elements that infer information about one or more products.

The environment data 1512 may include any other piece of information not directly related to the user or a particular product. For instance, the environment data 1512 may include information about particular criminal activity in the user's neighborhood or area, such as burglaries and/or package theft. The environment data 1512 may be polled from data feeds, and/or provided directly from a home security provider, for example.

FIG. 15B illustrates an example system for making product recommendations to a user. The system includes a product recommendation engine 1520, which receives the user profile 1516, scanned product identification information 1518, and a product catalog 1522, and outputs one or more recommended product(s) 1524. The product recommendation engine 1520 may apply information from the user profile 1516 (e.g., products that the user already owns, products that the user appears to have an interest in purchasing, home security devices that the user could benefit from, etc.) in relation to a particular scanned product's identification information (or other indication of the scanned product). Then, the product recommendation engine 1520 may select one or more products from the product catalog 1522 to recommend to the user as recommended product(s) 1524.

The product recommendation engine 1520 may include algorithms, models, and/or trained machine learning tools (e.g., neural networks, support vector machines, etc.) that score each product from the product catalog, relative to the user profile 1516 and the scanned product identification information 1518. As a specific example, a product of a type that appears to be of interest to the user, of a brand that the user prefers, having an aesthetic that matches the user's preferred aesthetic, and that the user does not already own may be highly scored by the product recommendation engine 1520, compared to a product that does not match in type, brand, and/or aesthetic (or that the user already owns). The product recommendation engine 1520 may then determine one or more scored products that meet particular criteria or exceed a particular threshold (e.g., the five highest scored products from the product catalog, any number of products that exceed a threshold score, etc.) as the recommended product(s) 1524.

FIG. 15C illustrates an example system for sorting search results according to the user's interests and preferences encoded in the user profile 1516. The system includes a product sorting engine 1528 that receives the user profile 1516 and a set of search results 1526, with each search result corresponding to a particular product. The product sorting engine 1528—similarly to the product recommendation engine 1520 described above—may score each product in the search results 1526 based on the extent to which that respective product matches the user's interests and preferences. A set of features for each of the search results may serve as the basis for ranking those search results, which may correspond to features stored in the user profile 1516. For example, each search result may be associated with a product type, brand, and/or aesthetic. A search result matching the user's preferred brand and/or aesthetic may rank more highly than a search result that does not.

Each feature may be weighted in terms of its relative importance to the user. For instance, if the user owns only a single brand of products, the user profile 1516 may indicate that the user's brand preference is very strong and more important than other product aspects, such as aesthetic or price. As another example, the user may own only black-colored devices, indicating that the user would be unlikely to be interested in purchasing a white-colored device. Thus, the importance or weight of each product characteristic may be taken into consideration when the product sorting engine 1528 ranks the search results. Regardless of the specific method used, the product sorting engine 1528 may apply the determined score values for each of the products in the search results 1526 and sort the search results in descending order (e.g., highest rank or most relevant to lowest rank or least relevant). Other sorting techniques are also possible.

FIG. 15D illustrates an example system for generating user notifications of specific interest to the user. This system addresses the realization that certain events may affect the user's security interests, such as spikes in criminal activity. A triggering event 1532, such as a reported crime or crimes, may be provided to the notification engine 1534, which in turn determines its relevance to the user associated with the user profile 1516 and generates a user notification 1536.

As a specific example, the notification engine 1534 may receive news, in the form of the triggering event 1532, of multiple reported incidents of break-in burglaries involving smashed first floor windows. The notification engine 1534 may first determine that the news is relevant to the user, based on the user's home being in close proximity to the reported crimes, for example. The notification engine 1534 may then determine whether the user owns sensors and/or devices that monitor first floor windows, such as glass-break sensors, security cameras aimed at the windows, window sensors, motion sensors, and/or other types of devices. Accordingly, the notification engine 1534 generates a user notification 1536, which may inform the user of the reported burglaries and recommend that the user confirm the functionality of the user's first-floor security devices and/or purchase one or more products to better protect their home.

Although a specific example is provided above, the notification engine 1534 may more generally provide notifications to the user that recommend products based on any number of triggering events and/or other factors, such as the presence or absence of certain security system components, improved versions of products already owned by the user, security system devices that might reduce homeowner's insurance costs, and/or any other event relevant to the user's home security system.

Figure 16:
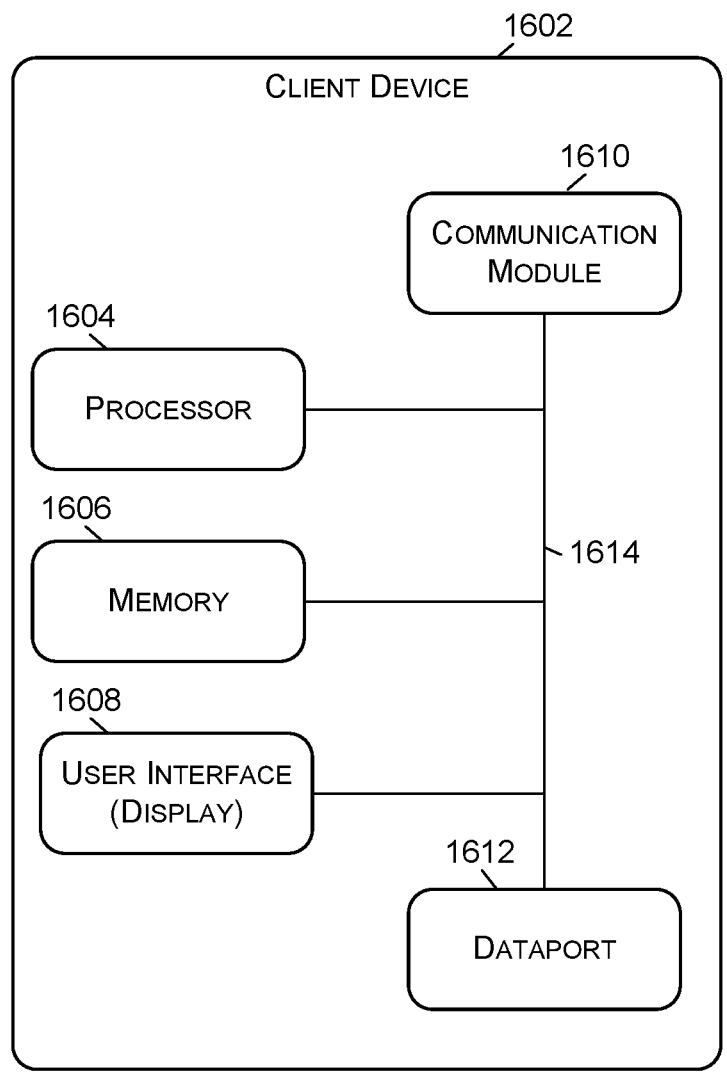
FIG. 16 is a functional block diagram of a client device on which the present embodiments may be implemented according to various aspects of the present disclosure.

FIG. 16 is a functional block diagram of a client device 1602 on which the present embodiments may be implemented according to various aspects of the present disclosure. The client device(s) 214, 216 described with reference to FIG. 2 may include some or all of the components and/or functionality of the client device 1602. The client device 1602 may comprise, for example, a smartphone.

With reference to FIG. 16, the client device 1602 includes a processor 1604, a memory 1606, a user interface 1608, a communication module 1610, and a dataport 1612. These components are communicatively coupled together by an interconnect bus 1614. The processor 1604 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 1606 may include both operating memory, such as random-access memory (RAM), as well as data storage, such as read-only memory (ROM), hard drives, flash memory, or any other suitable memory/storage element. The memory 1606 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1604 and the memory 1606 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1604 may be connected to the memory 1606 via the dataport 1612.

The user interface 1608 may include any user interface or presentation elements suitable for a smartphone and/or a portable computing device, such as a keypad, a display screen, a touchscreen, a microphone, and a speaker. The communication module 1610 is configured to handle communication links between the client device 1602 and other, external devices or receivers, and to route incoming/outgoing data appropriately. For example, inbound data from the dataport 1612 may be routed through the communication module 1610 before being directed to the processor 1604, and outbound data from the processor 1604 may be routed through the communication module 1610 before being directed to the dataport 1612. The communication module 1610 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1612 may be any type of connector used for physically interfacing with a smartphone and/or a portable computing device, such as a mini-USB port or an IPHONE®/IPOD® 30-pin connector or LIGHTNING® connector. In other embodiments, the dataport 1612 may include multiple communication channels for simultaneous communication with, for example, other processors, servers, and/or client terminals.

The memory 1606 may store instructions for communicating with other systems, such as a computer. The memory 1606 may store, for example, a program (e.g., computer program code) adapted to direct the processor 1604 in accordance with the present embodiments. The instructions also may include program elements, such as an operating system. While execution of sequences of instructions in the program causes the processor 1604 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 17:
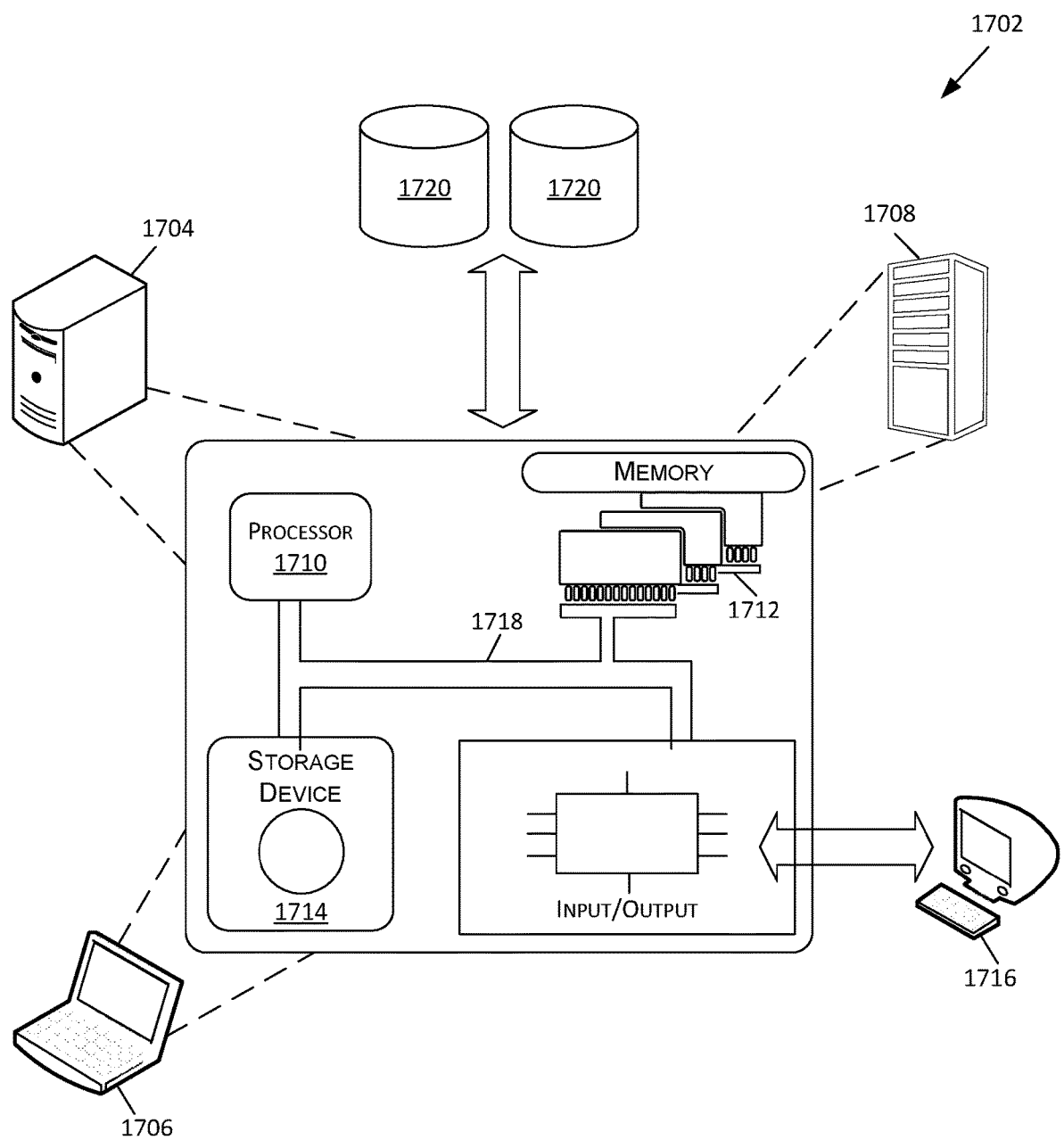
FIG. 17 is a functional block diagram of a general-purpose computing system on which the present embodiments may be implemented according to various aspects of present disclosure.

FIG. 17 is a functional block diagram of a general-purpose computing system on which the present embodiments may be implemented according to various aspects of the present disclosure. The computer system 1702 may be embodied in at least one of a personal computer (also referred to as a desktop computer) 1704, a portable computer (also referred to as a laptop or notebook computer) 1706, and/or a server 1708 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1702 may execute at least some of the operations described above. The computer system 1702 may include at least one processor 1710, memory 1712, at least one storage device 1714, and input/output (I/O) devices 1717. Some or all of the components 1710, 1712, 1714, 1716 may be interconnected via a system bus 1718. The processor 1710 may be single- or multi-threaded and may have one or more cores. The processor 1710 execute instructions, such as those stored in the memory 1712 and/or in the storage device 1714. Information may be received and output using one or more I/O devices 1716.

The memory 1712 may store information, and may be a computer-readable medium, such as volatile or non-volatile memory. The storage device(s) 1714 may provide storage for the system 1702 and, in some embodiments, may be a computer-readable medium. In various aspects, the storage device(s) 1714 may be a flash memory device, a hard disk device, an optical disk device, a tape device, or any other type of storage device.

The I/O devices 1716 may provide input/output operations for the system 1702. The I/O devices 1716 may include a keyboard, a pointing device, and/or a microphone. The I/O devices 1716 may further include a display unit for displaying graphical user interfaces, a speaker, and/or a printer. External data may be stored in one or more accessible external databases 1720.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

The various embodiments of the present methods and systems for determining product compatibility and demand have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that many people have some combination of networked appliances, home security devices, wireless speakers, virtual assistant devices, networked sensors (such as thermostats), and/or networked lighting in the home, workplace, or other premises. Often, these products are produced by different manufacturers. The user, therefore, may have difficulty understanding whether these devices are compatible with one another.

This challenge is compounded by the common manufacturer practices of releasing device software and/or firmware updates, modifying a backend server's functionality, and/or providing updates to a manufacturer's software application for a computing device or client device. For example, a device's functionality may be extended after the initial product release through a software update to provide an endpoint for controlling the device remotely over the Internet. Because compatibility between two devices may change over time, a user may believe that two products are incompatible when in fact they are compatible because of a software update that occurs after the user has purchased one or both of those two products.

The present embodiments solve these problems by providing an application for execution on a client device, such as a smartphone or tablet, with which a user can scan a product (e.g., in-store) to determine which, if any, of that user's devices are compatible with the scanned product. The application may scan a machine-readable optical label, a radio-frequency identification (RFID) tag, or otherwise determine which product is being scanned by the client device. Identifying information of the scanned product is then transmitted to a backend server, which determines the compatibility status of that scanned product with respect to one or more other devices (e.g., devices associated with the user, devices manually selected by the user, some or all devices offered by a particular manufacturer, etc.), and the compatibility status is then transmitted by the backed server to the client device.

The compatibility status may indicate the extent to which the scanned product is compatible with one or more other devices. For instance, an A/V recording and communication device ("A/V device") may have one or more interoperable features with a given client device, such as live video transmission, two-way audio communication, monitoring the status of the A/V device, and other features. As another example, an A/V device may be interoperable with a wireless speaker device, such that the wireless speaker device may serve as an audio output device to notify users at the premises about certain events (e.g., a doorbell button press). The compatibility status may describe such interoperability in a way that can be understood by a user.

Another aspect of the present embodiments includes the realization that product manufacturers and retailers can estimate or otherwise gauge the demand for a given product based on scanned product data. For example, the client device application described above may, in conjunction with a request for compatibility status, transmit to the backend server context information (e.g., as metadata) such as the date and time of the scan, the location at which the scan occurred (e.g., the particular store, city, region, etc.), information about the user, and/or information about whether the user subsequently purchased the scanned product. The backend server may analyze this information to determine metrics associated with the scanned product (e.g., relative product scanning frequency in different stores or regions, the relationship between purchasers and the number of compatible devices associated with those purchasers, etc.). The metrics may be provided to retailers, the product manufacturers, and/or others in order to facilitate an understanding about the demand for the given product.

In a first aspect, a method of determining compatibility of a network hardware device for connecting to a home security network is provided. The method involves receiving, by a processor of a client device, data from a capture input device of the client device. The data includes identification information associated with the network hardware device. The method also involves transmitting, by the client device, to a server computing device the data comprising the identification information associated with the network hardware device. The method further involves receiving, from the server computing device, compatibility information indicating whether the network hardware device is compatible with a hub device of the home security network. Additionally, the method involves displaying, on a display of the client device, the compatibility information.

In an embodiment of the first aspect, the data also includes at least one of data embedded in a machine-readable optical label associated with the network hardware device, and a digital image of the network hardware device.

In another embodiment of the first aspect, the method also involves receiving, from the server computing device, information about a set of other devices with similar specification as the network hardware device. The other devices may be compatible with the hub device of the home security network. The method may further involve displaying, on the display of the client device, the information about the set of other devices. The information about the set of other devices may only be received when the compatibility information indicates that the network hardware device is not compatible with the hub device of the home security network.

In another embodiment of the first aspect, the compatibility information further indicates whether the network hardware device is compatible with at least one other device associated with a user of the client device.

In another embodiment of the first aspect, the data transmitted by the client device to the server computing device further comprises geolocation data indicative of a location in which the data from the capture input device was received.

In another embodiment of the first aspect, displaying the compatibility information involves displaying human-readable text representative of an extent to which the network hardware device is compatible with the hub device of the home security network. The human-readable text representative of an extent to which the network hardware device is compatible with the hub device of the home security network may include a list of features of compatible features between the network hardware device and the hub device.

In another embodiment of the first aspect, the network hardware device is a first version of the network hardware device. In this embodiment, the method also involves receiving, from the server computing device, information about a second version of the network hardware device that is available or will be available within a threshold period of time. The method may further involve displaying, on the display of the client device, the information about the second version of the network hardware device.

In a second aspect, a method of determining compatibility of a network hardware device for connecting to a hub device of a home security network is provided. The method involves receiving, at a backend computing device, data from a client device, the data comprising identification information associated with the network hardware device. The method also involves processing, by at least one processor of the backend computing device, the data. The method further involves determining whether the network hardware device is compatible with the hub device of the home security network. Additionally, the method involves transmitting, by the backend computing device to the client device, compatibility information indicating whether the network hardware device is compatible with the hub device of the home security network.

In an embodiment of the second aspect, the method also involves identifying a set of other devices with similar specification as the network hardware device, wherein the other devices are compatible with the hub device of the home security network. The method according to this embodiment may further involve transmitting, by the backend computing device to the client device, identification data about at least one device of the set of other devices with similar specification as the network hardware device. The identification data about the at least one device of the set of other devices may include one or more of the following: an image of the at least one device of the set of other devices, a name of the at least one device of the set of other devices, compatibility information indicating whether the at least one device of the set of other devices is compatible with the hub device, and information about at least one vendor that provides the at least one device of the set of other devices.

In another embodiment of the second aspect, the network hardware device is a first version of the network hardware device. In this embodiment, the method also involves determining that a second version of the network hardware device is available or will be available within a threshold period of time. The method according to this embodiment may further involve transmitting, by the backend computing device to the client device, data related to the second version of the network hardware device.

In another embodiment of the second aspect, determining whether the network hardware device is compatible with the hub device of the home security network involves determining whether a messaging schema of the network hardware device and a messaging schema of the hub device are compatible.

In another embodiment of the second aspect, determining whether the network hardware device is compatible with the hub device of the home security network involves determining whether a physical attribute of the network hardware device and a corresponding physical attribute of the hub device are compatible.

In another embodiment of the second aspect, determining whether the network hardware device is compatible with the hub device of the home security network involves determining whether the network hardware device communicates and the hub device are both configured to communicate with an application programming interface (API).

In another embodiment of the second aspect, determining whether the network hardware device is compatible with the hub device of the home security network involves determining whether the network hardware device is compatible with the hub device of the home security network based on at least one stored relationship between the network hardware device and the hub device indicative of an extent to which the network hardware device is compatible with the hub device.

In another embodiment of the second aspect, the data comprising identification information received at the backend computing device further includes a user account identifier. In this embodiment, the method also involves retrieving a stored user profile associated with the user account identifier. The stored user profile may include one or more devices associated with a respective user. The method according to this embodiment may further involve determining whether at least one of the one or more devices associated with the respective user is compatible with the network hardware device. In addition, the method according to this embodiment may involve transmitting, by the backend computing device to the client device, compatibility information indicating whether the at least one device of the one or more devices is compatible with the network hardware device.

What is claimed is:

1. A method of determining compatibility of a network hardware device for connecting to a home security network that is deployed at premises associated with a user, the method comprising:
   receiving, by a processor of a client device associated with a user profile of the user, data from a capture input device of the client device, the data comprising identification information associated with the network hardware device;
   transmitting, by the client device to a server computing device, the data comprising the identification information associated with the network hardware device;
   receiving, from the server computing device, compatibility information indicating whether the network hardware device is compatible with a hub device of the home security network that is deployed at premises associated with the user, the hub device associated with the user profile; and
   displaying, on a display of the client device, the compatibility information.

2. The method of claim 1, wherein the user profile includes one or more products associated with the user, the one or more products comprising the hub device, and data indicative of one or more of:
   bibliographic information about the user; or
   a location of the premises associated with the user.

3. The method of claim 1, wherein the data comprises at least one of data embedded in a machine-readable optical label associated with the network hardware device, and a digital image of the network hardware device.

4. The method of claim 1 further comprising:
   receiving, from the server computing device, information about a set of other devices with similar specification as the network hardware device, wherein the other devices are compatible with the hub device of the home security network; and
   displaying, on the display of the client device, the information about the set of other devices.

5. The method of claim 4, wherein the information about the set of other devices is received only when the compatibility information indicates that the network hardware device is not compatible with the hub device of the home security network.

6. The method of claim 1, wherein the compatibility information further indicates whether the network hardware device is compatible with at least one other device associated with the user.

7. The method of claim 1, wherein the data transmitted by the client device to the server computing device further comprises geolocation data indicative of a location in which the data from the capture input device was received.

8. The method of claim 1, wherein displaying the compatibility information comprises displaying human-readable text representative of an extent to which the network hardware device is compatible with the hub device of the home security network.

9. The method of claim 8, wherein the human-readable text representative of an extent to which the network hardware device is compatible with the hub device of the home security network includes a list of features of compatible features between the network hardware device and the hub device.

10. The method of claim 1, wherein the network hardware device is a first version of the network hardware device, the method further comprising:
    receiving, from the server computing device, information about a second version of the network hardware device that is available or will be available within a threshold period of time; and
    displaying, on the display of the client device, the information about the second version of the network hardware device.

11. A method of determining compatibility of a network hardware device for connecting to a hub device of a home security network that is deployed at premises associated with a user, the method comprising:
    receiving, at a backend computing device, data from a client device associated with the user, the data comprising identification information associated with the network hardware device;
    processing, by at least one processor of the backend computing device, the data;
    determining whether the network hardware device is compatible with the hub device of the home security network that is deployed at premises associated with the user; and
    transmitting, by the backend computing device to the client device, compatibility information indicating whether the network hardware device is compatible with the hub device of the home security network.

12. The method of claim 11 further comprising:
    identifying a set of other devices with similar specification as the network hardware device, wherein the other devices are compatible with the hub device of the home security network.

13. The method of claim 12 further comprising:
    transmitting, by the backend computing device to the client device, identification data about at least one device of the set of other devices with similar specification as the network hardware device.

14. The method of claim 13, wherein the identification data about the at least one device of the set of other devices comprises at least one of an image of the at least one device of the set of other devices, a name of the at least one device of the set of other devices, compatibility information indicating whether the at least one device of the set of other devices is compatible with the hub device, and information about at least one vendor that provides the at least one device of the set of other devices.

15. The method of claim 11, wherein the network hardware device is a first version of the network hardware device, the method further comprising:
    determining that a second version of the network hardware device is available or will be available within a threshold period of time; and
    transmitting, by the backend computing device to the client device, data related to the second version of the network hardware device.

16. The method of claim 11, wherein determining whether the network hardware device is compatible with the hub device of the home security network comprises:

determining whether at least one communication protocol of the network hardware device and at least one communication protocol of the hub device are compatible.

17. The method of claim 11, wherein determining whether the network hardware device is compatible with the hub device of the home security network comprises:
determining whether a messaging schema of the network hardware device and a messaging schema of the hub device are compatible.

18. The method of claim 11, wherein determining whether the network hardware device is compatible with the hub device of the home security network comprises:
determining whether a physical attribute of the network hardware device and a corresponding physical attribute of the hub device are compatible.

19. The method of claim 11, wherein determining whether the network hardware device is compatible with the hub device of the home security network comprises:
determining whether the network hardware device and the hub device are both configured to communicate with an application programming interface (API).

20. The method of claim 11, wherein determining whether the network hardware device is compatible with the hub device of the home security network comprises:
determining whether the network hardware device is compatible with the hub device of the home security network based on at least one stored relationship between the network hardware device and the hub device indicative of an extent to which the network hardware device is compatible with the hub device.

21. The method of claim 11, wherein the data comprising identification information received at the backend computing device further includes a user account identifier, the method further comprising:
retrieving a stored user profile associated with the user account identifier, wherein the stored user profile includes one or more devices associated with the user;
determining whether at least one of the one or more devices associated with the respective user is compatible with the network hardware device; and
transmitting, by the backend computing device to the client device, compatibility information indicating whether the at least one device of the one or more devices is compatible with the network hardware device.

* * * * *